US010789816B2

(12) United States Patent
Pierce et al.

(10) Patent No.: US 10,789,816 B2
(45) Date of Patent: Sep. 29, 2020

(54) PROMOTING COMPETITIVE BALANCE IN MULTIPLAYER GAMING

(71) Applicant: VERSUS LLC, Las Vegas, NV (US)

(72) Inventors: Matthew D. Pierce, Los Angeles, CA (US); Brian V. Hughes, Las Vegas, NV (US); Brandii R. S. Grace, Harbour City, CA (US); Scott Sebelius, Aliso Viejo, CA (US)

(73) Assignee: Versus LLC, Los Angeles, CA (US)

( * ) Notice: Subject to any disclaimer, the term of this patent is extended or adjusted under 35 U.S.C. 154(b) by 0 days.

(21) Appl. No.: 16/264,200

(22) Filed: Jan. 31, 2019

(65) Prior Publication Data

US 2019/0228612 A1 Jul. 25, 2019

Related U.S. Application Data

(63) Continuation of application No. 14/796,966, filed on Jul. 10, 2015, now Pat. No. 10,242,538.

(60) Provisional application No. 62/027,704, filed on Jul. 22, 2014.

(51) Int. Cl.
*G07F 17/32* (2006.01)
*A63F 13/70* (2014.01)

(52) U.S. Cl.
CPC ...... *G07F 17/3295* (2013.01); *G07F 17/3237* (2013.01); *G07F 17/3276* (2013.01)

(58) Field of Classification Search
CPC ...... G07F 17/3276; A63F 13/70; A63F 13/75; A63F 13/77; A63F 13/79; A63F 13/847; A63F 13/85; A63F 13/87; A63F 2250/142
See application file for complete search history.

(56) References Cited

U.S. PATENT DOCUMENTS 6,206,782 B1 3/2001 Walker et al.
6,425,828 B2 7/2002 Walker et al.
6,837,793 B2 1/2005 McClintic
8,789,752 B1 7/2014 McGhie et al.
8,827,799 B1 9/2014 Brown et al.
8,944,320 B1 2/2015 McGhie et al.
2005/0261062 A1 11/2005 Lewin et al.
2007/0167210 A1 7/2007 Kelly et al.
2013/0109456 A1 5/2013 Wilkinson et al.
2014/0171182 A1 6/2014 Versaci

OTHER PUBLICATIONS

Extended European Search Report, dated Nov. 28, 2017, 9 pages.
(Continued)

*Primary Examiner* — Omkar A Deodhar
(74) *Attorney, Agent, or Firm* — Fenwick & West LLP

(57) ABSTRACT

By one or more processors of a computing device, receive a player game election of a player, the player game election comprising a skill based video game and one or more player characteristics of the player, determine a first player eligibility of the player to participate in the skill based video game comprising verify the one or more player characteristics, send the first player eligibility to an operator of the skill based video game, receive a list of one or more players that fulfilled a win condition for the skill based video game, determine a second player eligibility to receive a payout based on the list of one or more players that fulfilled the win condition, the first player eligibility, and a player preference for a payout type, and distribute the payout to the one or more players that fulfill the win condition.

20 Claims, 14 Drawing Sheets

(56) References Cited

OTHER PUBLICATIONS http://alphadraft.com, downloaded Oct. 16, 2015, 6 pgs.
http://battlefy.com, downloaded Oct. 16, 2015, 5 pgs.
http://gamblitgaming.com, downloaded Nov. 3, 2015, 4 pgs.
http://skillz.com, downloaded Nov. 3, 2015, 2 pgs.
http://worldgaming.com, downloaded Nov. 3, 2015, 7 pgs.
http://www.bspot.com, downloaded Oct. 16, 2015, 3 pgs.
http://www.draftkings.com, downloaded Oct. 16, 2015, 5 pgs.
http://www.fanduel.com, downloaded Oct. 16, 2015, 6 pgs.
http://www.gamiker.com, downloaded Nov. 5, 2015, 4 pgs.
http://www.vg247.com, downloaded Nov. 3, 2015, 7 pgs.
http://www.xfire.com, downloaded Oct. 16, 2015, 5 pgs.
United States Office Action, U.S. Appl. No. 14/796,966, dated Jan. 20, 2017, 12 pages.
United States Office Action, U.S. Appl. No. 14/796,966, dated May 3, 2018, 9 pages.
United States Office Action, U.S. Appl. No. 14/796,966, dated Sep. 13, 2017, 9 pages.

PROMOTING COMPETITIVE BALANCE IN MULTIPLAYER GAMING

RELATED APPLICATION

This application is a continuation of U.S. patent application Ser. No. 14/796,966, filed Jul. 10, 2015, which claims the benefit, under 35 U.S.C. § 119(e), of U.S. Provisional Patent Application No. 62/027,704, filed Jul. 22, 2014. All of the above applications are hereby incorporated herein by reference in their entirety.

FIELD

This disclosure generally relates to online gaming and more specifically relates to legal online gaming tournaments.

BACKGROUND

An online game is a video game played over some form of computer network, typically on the internet. Online games may range from simple text based environments to games incorporating complex graphics and virtual worlds populated by many players simultaneously. A multiplayer online game may be played via a game server over the internet, with other players around the world. Many online games have associated online communities, making online games a form of social activity beyond single player games. A wide variety of online games are available for all type of game players.

DESCRIPTION OF EXEMPLARY EMBODIMENTS

Figure 1:
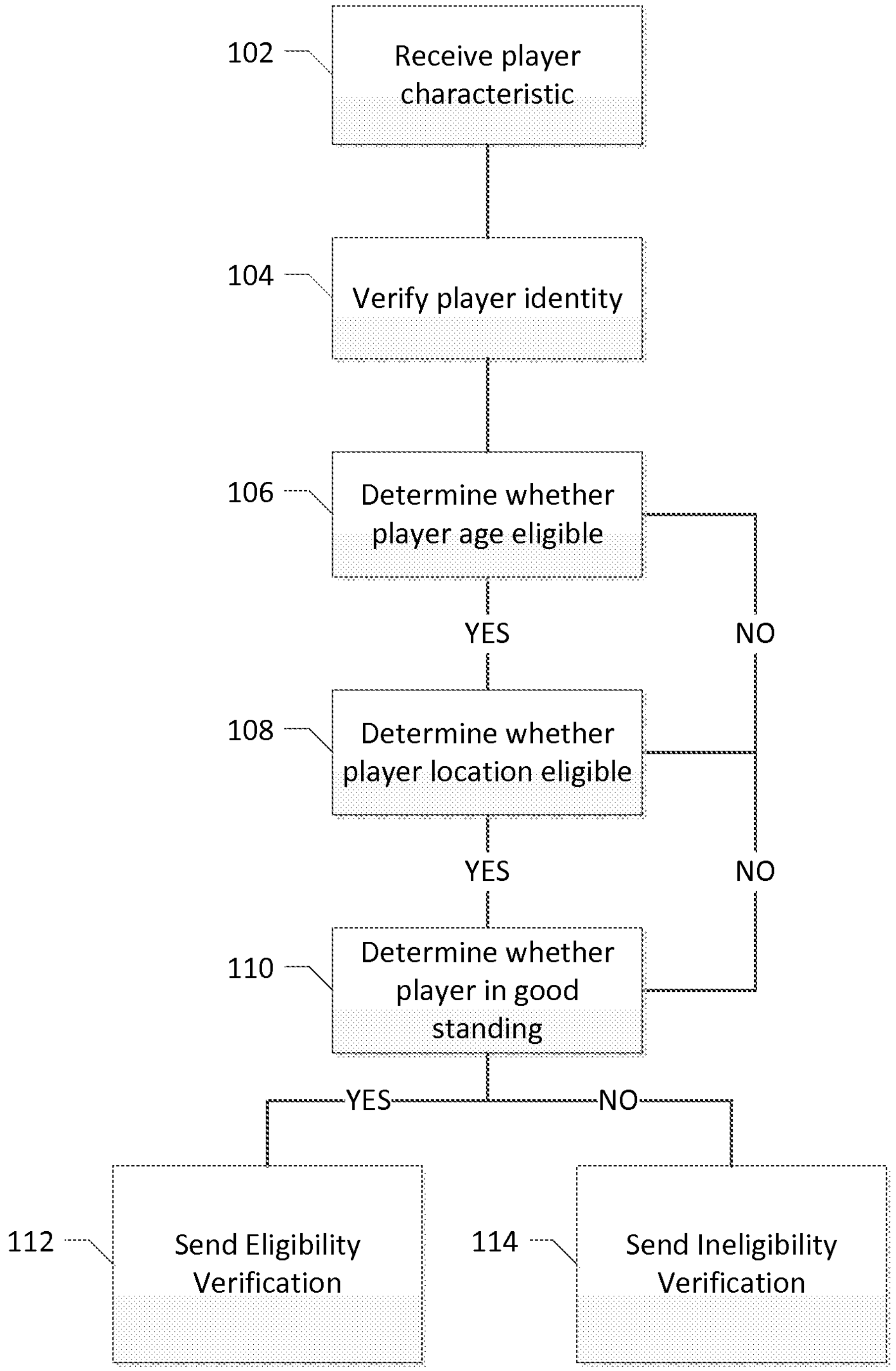
FIG. 1 illustrates an example method of evaluating player characteristics.

Operators, developers, publishers, and facilitators want to create, and operate, tournaments of a variety of games. Particular embodiments comprise systems and methods that allow operators, developers, and publishers of a variety of games to offer tournaments of those games to players. Using particular embodiments described herein, operators, developers, facilitators, and publishers may offer a variety of prizes for participation and performance in particular tournaments. Particular embodiments allow operators, developers, and publishers and facilitators of games to monetize many types of skill-based games, from single player to multiplayer to massive multiplayer. Particular embodiments may utilize conditional prize distribution that allows operators to offer and distribute multiple types of payouts based on a player's characteristic. In this manner, pay-to-play, real-money, real-prize, and for-prize tournaments may be offered simultaneously to all players, in all jurisdictions, legally based on all local laws and regulations and player preferences. Particular example embodiments may provide risk management for the operation of prize-based tournaments in one or more jurisdictions. Separate elements of particular example embodiments may be employed separately or together.

Particular example embodiments may evaluate player eligibility, promote the skill component in any skill-based game at the tournament level, decrease the role of chance for any game at the tournament level, and advance a series of real-money or conditional payouts and prizes for players participating in tournaments. In particular example embodiments, players that are ineligible for real-money tournaments may participate in the same tournaments as players who are eligible for real-money tournaments. In particular example embodiments, players ineligible for real-money and real-money equivalents may receive virtual goods, downloadable content, or other prizes for their performance.

Particular example embodiments comprise one or more real players or virtual players, having a player profile and player identity, qualifying conditions, a game, a win condition, an operator or a facilitator, operator consideration, player consideration, a currency, a virtual good, and a payout. Particular example embodiments may also have a virtual currency and a pseudo-currency.

A player or team of players may be any individual, real person, or group of two or more individuals, real people, or a virtual player or players, participating in a game or tournament. Player or team characteristics may be specific attributes that describe players or teams, including but not limited to identity, including one or more of phone number, social security number, IP address, and a player identity, gender, age, location, eligibility, demographics, such as income, playing history, including performance, team composition and history, including performance, skill level, enjoyment, device type, such as console, pc, mobile device, and the like, in-game purchase history, control configurations, such as weapons, weapons layout, preferred avatar, character clothing, player actions, and any other attributes that differentiate a player or team from another player or team. Player or team characteristics may be updated over time based on changes inside, or outside, of the example embodiments described herein (players age, change locations, change devices, win or lose games, join or quit teams, gain or lose eligibility, while states/jurisdictions may change regulations).

A player identity may be a unique set of data or markers, established by an operator to monitor and track each player on the system. A player identity may include a combination of verified identity information that exists outside of the platform, such as phone number, social security number, and birthdate, in-game history, identity, and performance, including a username, tournament record, and purchase history, or a unique identifier. A player identity may be made up of any one or more of the following: name, age, username, phone number, social security number, tax ID number, age, location, email address, birthdate, time on-site, time in-game, registration date and time, tournament record, purchase history, or any other identifying data that an operator could use.

A player profile may be a player-facing interface unique to each player that the player may use to access any number of things including their wallet, their tournament history, their username, their invitation list, such as accepted, declined, and pending invitations, their friend list, certain data about their gameplay, and certain identification data. A player profile may be distinct from a player identity insofar as the player identity may be accessible by operators while the player profile may be player-facing. A player wallet may be a database associated with each player identity where that player's virtual currency is stored or tracked. Players may access their wallet in any number of ways whether their wallet exists on their own device, an operator's device, or a third-party's device, whether local or cloud-based.

A virtual player may include bots or non-human software programs that mimic the actions of a real player in a given game. In particular embodiments, virtual players may be used to assess a real player's skill level so that they may be matched with other real players of similar skill. In particular embodiments, one or more players may play against any number of virtual players in a tournament. In particular embodiments, the entire tournament may be made up of virtual players in a contest where real players write and compete with their best virtual player or players.

A designation may be a characteristic that is given to a player by an operator or facilitator within a game or on the platform. A designation may be temporary, such as a "winner of game #1006", or "platinum-level player," and may be used by an operator or facilitator to facilitate tournament matching, player matching, payouts, tournament invitations, and other features. In particular embodiments, a designation, such as "winner of game # X," may function in place of a pseudo-currency transaction. Designations may change as circumstances change.

A condition may qualify or disqualify a player or team from receiving particular prizes. One or more Conditions may be the established rules for gameplay, specifically related to the distribution of prizes. A condition may also be referred to as a qualifying condition. In particular embodiments, all players are made aware of the conditions prior to those players playing the game or entering the tournament. A condition may be set by the operator of the tournament, or may be prescribed by local or federal law enforcement or other governing body. In an example embodiment, players may be required to meet certain age, location, and other eligibility conditions to be eligible to receive a real money prize payout, while players not meeting those conditions may instead be eligible to receive prize payouts in virtual goods, including downloadable content.

A game or tournament may be any online contest or tournament of any kind, including casual or skill-based video games or tournaments as well as fantasy sports, e-sports, or live-action real-life sport tournaments.

Games may be any one or more of the following game types, including but not limited to:

Action Games—A game genre that emphasizes challenges that include hand-eye coordination and reaction-time;

Strategy Games—A game that emphasizes skillful thinking and planning to achieve victory and often emphasizes strategic, tactical, and sometimes logistical challenges, or economic challenges and exploration;

TBS (Turn-Based Strategy)—A type of strategy game where opponents (real or computer controlled artificial intelligence) take turns when playing;

RTS (Real-Time Strategy)—Combatants (whether players or computer controlled AI) act simultaneously "in real-time" to position and maneuver units and/or structures under their control to secure or capture territory or resources, destroy specific asset, or create certain resources or structures first, which is generally limited by a requirement to expend accumulated resources;

ARTS (Action Real-Time Strategy)—Each player controls characters and units through an RTS-style interface, and it differs from traditional RTS games in that there is generally no unit construction and players control just one character;

MOBA (Multiplayer Online Battle Arena)—An ARTS style game that is played multiple combatants, generally over the internet and typically emphasizes cooperative team-play;

Battle Arena—A game in which two or more combatants fight each other to a predetermined win or loss condition;

Hero Brawler—A shorter, simplified version of an ARTS or MOBA in which the focus is shifted to map objectives and/or maintaining a connection between the player and Hero avatar;

Tactical Wargames—A type of war game that models military conflict at a tactical level, where units range from individual vehicles and squads to platoons or companies, and these units are generally rated based on types and ranges of individual weaponry;

TBT (Turn-Based Tactics)—A subgenre of strategy games that, through stop-action, simulates the considerations and circumstances of operational warfare and military tactics in generally small-scale confrontations as opposed to more strategic considerations of turn-based strategy (TBS) games. Gameplay is characterized by the expectation of players to complete their tasks using only the combat forces provided to them, and usually by the provision of a believable representation of military tactics and operations;

RTT (Real-Time Tactics)—A subgenre of tactical war games played "in real-time" simulating the considerations and circumstances of operational warfare and military tactics. It is differentiated from real-time strategy gameplay by the lack of classic resource micromanagement and base or unit building, as well as the greater importance of individual units and a focus on complex battlefield tactics;

Tower Defense—A subgenre of RTS in which players attempt to stop enemies from encroaching on a particular territory or achieve a certain goal. Players stop enemies by building various types of equipment (traps, units, weapons, towers, etc.) which slow, stop, or defeat enemies as they pass. Enemies and towers usually have varied abilities, costs, and upgrade prices. When an enemy is defeated, the player typically earns money or points to be utilized in a manner which advances the player's strategy (such as buying, unlocking, or upgrading equipment, upgrading the speed or amount of money or points earned, upgrading the rate at which equipment upgrades, etc.);

4X—A subgenre of strategy-based games in which players control an empire and "eXplore, eXpand, eXploit, and eXterminate". Emphasis is placed upon economic and technological development, as well as a range of non-military routes to supremacy;

Artillery game—A subgenre of strategy-based games in which player fight each other in combat utilizing tanks or other projectile-type weapons;

War-game—A subgenre of strategy games that emphasize strategic or tactical warfare on a map, often with historical (or near-historical) accuracy;

Adventure Games—A game genre in which the player assumes the role of protagonist in an interactive story driven by exploration and puzzle-solving;

Action-Adventure Games—A game genre that combines elements of the adventure game genre with various action game elements;

HnS or H&S ("Hack 'n' Slash" or "Hack and Slash")—A game sub-genre that emphasizes combat, typically (although not exclusively) with a focus on utilizing hand-to-hand weaponry;

Beat 'em Up (also known as "brawler")—An action game sub-genre featuring melee combat between the protagonist and an improbably large number of underpowered enemies;

Platform Game (aka "Platformer")—An action game sub-genre which involves guiding an avatar to jump, swing, launch, or otherwise move between suspended platforms and/or over obstacles to advance through the game;

Platform-Adventure Games—An action game sub-genre that fuses platform game fundamentals with elements of action-adventure games or elements of RPGs. Typically these elements include the ability to explore an area freely, with access to new areas often granted by either gaining new abilities or using inventory items;

Endless Running Games (aka "Endless Runners" or "Infinite Running Games")—A sub-genre of platform games in which the player character is continuously moving through a procedurally generated, theoretically endless game world. The object of these games is to get as far as possible before the character is halted (frequently via death or destruction);

Puzzle Platformers—A sub-genre of platform games which are characterized by their use of a platform game structure to drive a game whose challenge is derived primarily from puzzles;

Shooter Game—A sub-genre of action games that incorporate the firing of projectiles to defeat enemies and/or overcome obstacles;

FPS (First Person Shooter)—A sub-genre of 3D (or pseudo-3D) perspective shooter games in which the player views the majority of gameplay through a "first person" camera mode. Ostensibly, the player is looking through the "eyes" of the character the player is controlling. This viewing is generally indicated by seeing the character's arms (or arm-like appendages when the character is non-human or otherwise lacks arms) extending out in front of the viewing screen;

Third-Person Shooter—A sub-genre of shooter games which are characterized by a third-person camera view that fully displays the player character in his/her surroundings;

Rail Shooter—A sub-genre of shooter games in which a player's control is limited to directing where to fire a projectile or move an avatar around the screen. A player does not control the path their avatar takes from the start to the end (although they may be able to pause that movement), as if the player is tied to a rail like a roller coaster;

Tactical Shooter—A sub-genre of shooter games that generally simulate realistic squad-based or man-to-man skirmishes. This sub-genre includes the more specific "military shooter" sub-genre in which the gameplay simulates realistic military combat;

Shoot'em Up—A specific sub-genre of shooters wherein the player may move up and down and left and right around the screen, typically firing straight forward. Shoot 'em ups are often categorized by viewpoint. This includes fixed shooters on fixed screens, scrolling shooters that mainly scroll in a single direction, top-down shooters (sometimes to referred to as twin-stick shooters) where the levels are controlled from an overhead viewpoint, and isometric shooters which use an isometric perspective. This genre also includes "run and gun" games which emphasize greater maneuvering or even jumping;

Role-Playing Shooter—A sub-genre of shooters featuring elements of both shooter games and action RPGs;

CTF (Capture the Flag)—An action game where two teams each have a flag (or other marker) and the object is to capture an opponent's flag, located at the opponent's "base," and bring it safely back to a player's own base;

Rhythm Game (aka "Music Game", "Rhythm Action Game")—A music-themed sub-genre of action game that challenges a player's sense of rhythm;

Fighting Game—A type of game where players controls a character that engages in close combat with an opponent. These characters tend to be of equal power and fight matches consisting of several rounds, which take place in an arena. Gameplay generally includes techniques such as blocking, counter-attacking, and chaining together sequences of attacks known as "combos";

Stealth Game—A type of action game that rewards players for using stealth to avoid or overcome antagonists. Games in this genre typically include mechanics allowing players to remain undetected by hiding, using disguises, and/or avoiding noise;

Survival Game (AKA "Survival Horror")—A sub-genre of action games inspired by horror fiction, it focuses on survival of certain characters and trying to scare the player(s). Although combat may be a part of the gameplay, the player is usually made to feel less powerful than in typical action games, generally through limitations in things like ammunition, health, speed, etc.;

Open World Game—A type of game where a player may roam freely through a virtual world and is given considerable freedom in choosing how or when to approach objectives. The term "free roam", "sandbox", and "free-roaming" are often used to refer to this type of game;

Simulation Games—A diverse super-category of games, generally designed to closely simulate aspects of a real or fictional reality;

Sports Games—A type of simulation game that simulates the practice & play of traditional sports;

Racing Games—A sub-genre of games in which a player partakes in a racing competition—generally with some type of land, air, or sea vehicle. They may be based on anything from real-world racing leagues to entirely fantastical settings and/or vehicles;

Flight Simulator Games—A game that artificially re-creates aircraft flight and the environment in which it flies;

Vehicle Simulation Games—A sub-genre of simulation games which attempt to provide the player with a realistic interpretation of operating various kinds of vehicles. This includes automobiles, aircraft, watercraft, spacecraft, military vehicles, and a variety of other vehicles. The main challenge is to master driving and steering the vehicle from the perspective of the pilot or driver, with most games adding another challenge such as racing or fighting rival vehicles. Games are often divided based on realism, with some games including more realistic physics and challenges such as fuel management;

Dating Simulation Games (aka "Social Simulation Games")—A sub-genre of simulation games that explore social interactions between multiple characters;

Digital Pet Games (aka "Virtual Pet", "Tomodachi Game", "Artificial Pet", "Pet-Raising Sim", or "Babysitting Game")—A sub-genre of simulation games that involves raising, caring, and often befriending a virtual pet, baby, or other dependent being;

City-Building Game—A sub-genre of simulation games (and sometimes strategy games) where players act as the overall planner and leader of a city, looking down on it from above, and being responsible for its growth and management;

CMS (Construction and Management Simulation)—A sub-genre of simulation games in which players build, expand or manage fictional communities or projects with limited resources. Games in this category are sometimes also called "management games";

God Game—A sub-genre of simulation games that casts the player in the position of controlling the game on a large scale, as an entity with divine/supernatural powers, as a great leader, or with no specified character, and places them in charge of a game setting containing autonomous characters to guard and influence;

PvP (Player vs Player)—A type of multiplayer interactive conflict within a game between two or more live participants. This is in contrast to games where players compete against computer controlled opponents, which is correspondingly referred to as player versus environment (PvE);

RPG or CRPG ("Role Playing Game" or "Computer Role Playing Game")—A game genre where the players control the actions of one or more a protagonists immersed in a fictional world. Typically, there is a strong focus on player character development, often referred to as "leveling" a character;

JRPG (Japanese Role Playing Game)—A sub-genre of role-playing games with mechanics related to early RPGs that came out of Japan. These typically focus more on story and characterization;

ARPG (Action Role-Playing Game)—A sub-genre of role-playing games that incorporate elements of action or action-adventure games, emphasizing real-time action where the player has direct control over characters, instead of turn-based or menu-based combat. These games often use combat systems similar to "hack and slash" or "shooter games";

SRPG (Strategy Role-Playing Game)—A type of video game which incorporates elements of traditional role-playing games and strategy games and emphasizes strategic gameplay;

TRPG (Tactical Role-Playing Game)—A type of game which incorporates elements of traditional role-playing games and tactical games to emphasizes tactical rather than high-level strategic gameplay. (Also known as "Simulation RPGs");

Roguelike—A sub-genre of role-playing games, characterized by procedural level generation and permanent death. Roguelikes descend from the 1980 game "Rogue". Most Roguelikes mirror Rogue's sprite-based graphics, turn-based gameplay, and high fantasy settings. Games which do all of these are said to conform to the "classical" or "Berlin" interpretation of the genre. Newer variations of roguelikes incorporate other gameplay genres, thematic elements, and graphical styles—these are sometimes called "roguelike-like", "rogue-lite" or "procedural death labyrinths" to reflect the variation from these earlier titles;

MUD (originally "Multi-User Dungeon", other variants include "Multi-User Dimension" and "Multi-User Domain")—MUDs generally combine elements of role-playing games, hack and slash, player versus player, interactive fiction, and online chat. Players may read or view descriptions of rooms, objects, spells, other players, non-player characters, and/or actions performed in the virtual world;

Dungeon Crawler—A sub-genre of role-playing games in which heroes navigate a labyrinthine environment, battle various monsters, and loot treasure;

MNIO or MMOG ("Massively Multiplayer Online" or "Massively Multiplayer Online Game")—A multiplayer game which is capable of supporting large numbers of players simultaneously. Generally played over the internet. MMOs usually have one or more persistent worlds that exist for the duration of gameplay—which may last anywhere from a few moments to decades;

MMORPG (Massively Multiplayer Online Role Playing Game)—A subgenre of RPG which combines the genres of role-playing games and massively multiplayer online games so a very large number of players may interact with one another within a virtual world. MMORPGs are distinguished from single-player or small multiplayer online RPGs by the number of players, and by the game's persistent world which continues to exist and evolve while the player is offline and away from the game;

MMORTS (Massively Multiplayer Online Real-Time Strategy)—A mixture of real-time strategy and massively multiplayer online games, in which a very large number of players interact with one another within a virtual world. Players often assume the role of a general, king, or other type of figurehead leading an army into battle while maintaining the resources needed for such warfare;

Casual Game—A game targeted at or used by a mass audience of casual gamers. Casual games may have many types of gameplay, and fit in many genres. They are typically distinguished by their simple rules and lack of commitment required in contrast to more complex hardcore games;

Arcade Game—A generally action-style genre of game that is simple enough to have existed in arcade consoles;

Puzzle Game (aka "Puzzler")—A genre of games that emphasize puzzle solving. The types of puzzles to be solved may test many problem solving skills including logic, math, pattern recognition, sequence solving, word completion, etc.;

Hidden Object Game—A sub-genre of puzzle game in which the player must find items from a list that are hidden within a picture;

Social Game—A game that incorporates online social interaction. Typically, this term is used to refer to games whose social mechanics are asynchronous—meaning players do not need to interact in real-time. (Sometimes referred to as "Social Network Games");

Maze Game—A game genre in which the main playing field is a maze;

Pinball—A game in which points are scored by a player manipulating one or more steel balls on a play field. The primary objective of the game is to score as many points as possible. Points are earned when the ball strikes different targets on the play field. A drain is situated at the bottom of the play field, partially protected by player-controlled "flippers". A game ends after all the balls fall into the drain;

Match-3 Game (aka "Tile-Matching" or "Color-Matching")—A type of puzzle game where players manipulate objects (or "tiles") in order to make them line-up or connect (and likely disappear) according to the game's matching criterion. The core challenge of matching games is the identification of patterns on a seemingly chaotic board;

Microgames—A series of short, simple games mainly with a single objective and limited action set;

Trivia Game—In trivia games, the object is to correctly answer questions, usually with the goal of obtaining points;

Party Game—A game intended to be played as a form of entertainment at social gatherings. Party games usually involve more than one player;

Board Game—A game that involves counters or pieces moved or placed around a pre-marked surface or "board", according to a set of rules;

Card Game—Any game using playing cards as the primary device with which the game is played, be they traditional or game-specific cards;

CCG (Collectable Card Game)—A collectible card game is defined by the use of decks of proprietary cards that differ between players. The contents of these decks are a subset of a very large pool of available cards which have differing effects, requirements, and art. A player generally accumulates his or her deck through purchase, trade, or completing certain objectives (such as winning tournaments). Players each use their own deck to play against opponents;

Collectable Figure Game—A game designed much like a CCG, only using "action figures", "figurines", "collectables", or "toys" in place of cards;

Dice Game—A game that utilizes dice as a core mechanic;

Casino Game—A game specifically designed to make the betting process a strategic part of the game;

Virtual Casino Game—A casino game in which players are betting virtual currency rather than "real money". Although the virtual currency is often purchased with real money, the virtual currency generally cannot be converted back into "real" money;

Skill-Based Game—A game where the outcome is determined primarily by mental or physical skill, rather than by chance;

Poker—A family of casino (and virtual casino) games in which players bet into a pool, called a "pot", that the value of their hand will beat all others according to a set ranking system;

ARG (Alternate Reality Game)—An interactive networked narrative that uses the real world as a platform and uses transmedia storytelling to deliver a story that may be altered by players' ideas or actions. The genre is typified by intense player involvement with a story that takes place in real time and evolves according to players' responses;

Serious Game—A game designed for a primary purpose other than pure entertainment. The "serious" adjective is generally meant to refer to products used by industries like defense, education, scientific exploration, health care, emergency management, city planning, engineering, and politics;

Art Game (aka "Arthouse Game" or "Auteur Game")—A work of interactive new media digital software with its primary focus being on its intent to be "art". Sometimes a member of the "art game" sub-genre of the serious game genre;

Educational Game—A "serious" game explicitly designed for educational purposes, or which has incidental or secondary educational value;

Exergame (aka "Fitness Game")—A game that, when played, may double as a form of exercise;

Advergame—A game expressly commissioned to promote a product or service;

E-sports Game (or "Electronic Sports Game")—A term for organized video game competitions, especially between professionals; and any additional game types.

Some examples of games where players compete by joining groups or teams to compete for a goal include, but are not limited to, Multiplayer Online Battle Arena (MOBA)-style games, such as League of Legends, Defense of the Ancients (DOTA), Realm of the Titans, Crasher, and Super Monday Night Combat, or other similar games.

Tournaments may be any of one or more of the following tournament types, including, but not limited to:

One on One—Two players face-off in head-to-head competition—either directly opposing one another or indirectly by beating a specific challenge;

Multiplayer—More than two players face-off in head-to-head competition—either directly opposing one another or indirectly by beating a specific challenge, where these players may be facing all other players at once;

Team vs Team—Two teams face-off in head-to-head competition—either directly opposing one another or indirectly by beating a specific challenge;

Multi-Team—More than two teams face-off in head-to-head competition—either directly opposing one another or indirectly by beating a specific challenge, where these players may be facing all other players at once;

Round Robin—A competition "in which each contestant meets all other contestants in turn," which is in contrast to an elimination tournament;

Single Elimination—A tournament in which each player is eliminated from the competition after losing to a single opponent;

Double Elimination—A tournament in which each player is eliminated from the competition after losing to a 2 opponents;

Triple Elimination—A tournament in which each player is eliminated from the competition after losing to a 3 opponents;

Tag Team Tournaments—A tournament in which competitive teams are larger than the number of active participants competing at any one time. Active competitors may "swap" with other team-members by "tagging" other players in or out of the competition;

League Tournament—A tournament that impacts rankings among a particular "league" system;

All-Star Tournament—A tournament limited to elite participants;

Sponsored Tournament—A tournament which is run by a sponsor for promotional purposes, or where a sponsor provides the Operator Consideration;

Featured Tournament—A tournament that a dev, sponsor, or other party would like to highlight as "special";

Invite-Only Tournament—A tournament that may only be entered if would-be participants have been given an invite;

Playoff Tournament, Postseason, or Finals—a competition played by competitors to determine a league champion or a similar accolade, which depending on the game, playoffs may be either a single game, a series of games, or a tournament, and may use a single-elimination system or one of several other different playoff formats;

Ranking Tournament—A tournament intended to rank players; Up and Down—Players move up and down the tournament bracket as they win or lose games;

Ladders—Players may challenge players above them—if the challenger wins, the positions of both are swapped;

Consolation Tournament—A single elimination tournament with a loser's bracket, where after the first round, the winners move out of the "original" bracket and the losers are put on a "new" bracket, and on both brackets, after the first round, if you lose you're out;

Sudden Death—An extra final game to finalize rankings in the case of a tie or insufficient result;

Elimination Round—A round played to eliminate competitors;

Lightning Round—A rapid play version;

Blind Draw Tournament—A tournament not using prior rankings tournament;

Seeded Tournament—A tournament utilizing prior rankings;

Buy-in Tournament—Paying an upfront fee to enter a tournament;

March Madness Pool—A form of sports betting based on the annual NCAA Men's

Division I Basketball Championship each spring in the United States;

Super Bowl Square—The Football version of a "March Madness Pool";

Swiss Tournament—A non-elimination tournament format where there are several rounds of competition, but considerably fewer rounds than in a round-robin tournament, so each player (team or individual) does not play against every other competitor, but competitors meet one-to-one in each round and are paired using a predetermined set of rules designed to ensure that as far as possible a competitor plays competitors with the same current score, subject to not playing the same opponent more than once, and the winner is the competitor with the highest aggregate points earned in all rounds.

A win condition, also known as a victory condition, may be the game state that must be reached to establish the order of finish in a particular game or tournament. In particular embodiments, that may include a first, second, third, fourth place finisher through to X place. In particular embodiments, there may be a winning player or team and a losing player or team.

In particular embodiments, the win condition may be established by the operator and is known to all players prior to acceptance of their consideration for entry into the game or tournament. Operators, and in particular embodiments players and teams, will establish and agree in advance of the tournament, upon the win condition that will be used to determine the order of finish. This win condition may be a goal, such as most kills, checkmate, capturing a flag, controlling an area, scoring a certain number of points, collecting victory points, and completing a mission, or it may be a loss avoidance or piece elimination condition, such as being checkmated, running out of cards, running out of hitpoints, being tagged, or it may be a puzzle-guessing condition, such as successfully solving a puzzle or a riddle, or it may be a race to advance beyond a certain position, or amount of points including high score, or it may be a fastest time, or it may be a condition that requires players to acquire and assemble a set of resources into a defined winning structure or into a structure that is determined to be better than the structures of other players. The win condition may also be any combination of these conditions or of an avoidance of loss conditions that have been defined. In particular embodiments the win condition may be such that multiple players may achieve the state or that only one player may achieve the state, or even that players would be evaluated in order of finish. In particular embodiments, achievement of the win condition may confer the operator's consideration on the winner(s) according to the conditions of the tournament.

In particular example embodiments, there may be a single winner that has satisfied the win condition. In particular example embodiments, a payout may be divided among more than one winner. In particular example embodiments, such as a top-3 style, each of the 3 best scoring participants receive a portion of total payout. For example, 1st place receives 50% of the payout, 2nd place receives 30% of the payout, and 3rd receives 20% of the payout. In particular embodiments, a top-3 style is applied to tournaments with 7 or more participants.

An operator may be a party, company, group, or individual who creates and manages a tournament. In particular embodiments, an operator may be a game developer or publisher, such as Activision, Riot, Wargaming, E A, Ubisoft, GameStop, or other similar organization. In particular embodiments, an operator may be Versus LLC, Versus Gaming Network, or other similar third party tournament operators that may be operating tournaments in concert with, or wholly separate from the game developers and publishers. In particular embodiments, an operator may an individual or other company independently operating a tournament. In particular embodiments, an operator may be a player who creates and operates a tournament for themselves, their friends, colleagues, or other players.

A facilitator may be a company, platform, marketplace, or entity that exists to manage tournaments, including real-money tournaments. In particular embodiments, an operator may also be a facilitator. In particular embodiments, a facilitator may be a different entity from an operator that does not develop or publish games, but instead sells games, makes games available for sale, or manages tournaments and the associated distributions of prizes based on player conditions.

A sponsor may be a company, platform, marketplace, or entity that exists to sponsor tournaments. A sponsor may also be a facilitator or an operator, but it may also be neither a facilitator nor an operator, and solely a sponsor. A sponsor may sponsor tournaments for a prize, such as physical goods. A sponsor may provide operator consideration for a game or tournament.

Operator consideration may be the stakes of a game or tournament, a prize offered to the players by the operator. Operator consideration, or a posted prize, may be clearly posted and known to all players prior to entering a tournament. Operator consideration may be real money, pseudo-currency, virtual currency, virtual good, or a physical good, or any combination thereof that may be provided by an operator, facilitator, or sponsor. Player preferences may impact operator consideration, such that if a player expresses a preference for a virtual good over a physical good, or a virtual good over a virtual currency, the operator may choose to provide the player with any prize of the player's choice provided the player has achieved the win condition and their characteristics are consistent with the eligibility conditions. In particular example embodiments, a player may express a preference for two "rare items" instead of 500 tokens, the operator may choose to provide that player with the rare items instead of the tokens as a prize for fulfilling the win condition.

Player consideration may be real money, pseudo-currency, virtual currency, virtual good, or code that is paid by a player, team, or on a player's behalf as a condition of entering a tournament. Player consideration may also be referred to as an entrance fee. Player consideration may be paid or exchanged by the player through any one or more of the following: real money, virtual currency, a code, coupon, or item that grants the player entrance into a tournament.

Real money may be any currency that may be exchanged for goods and services outside of a game or a game platform. Examples of real money may include, but are not limited to, United States Dollars, European Union Euros, Mexican Pesos, and Chinese Yuan. A bank may be any financial institution where real money, real currency, or equivalents are held. In particular embodiments, a player may be able to transfer or pay player consideration from a bank to a facilitator or an operator, or both, through a payment provider, such as Paypal, Stripe, ACH, or any other payment provider. In particular embodiments, a player may send the bank currency from the player's wallet.

Virtual currency may be any digital money that may be exchanged for something of value. In particular embodiments, virtual currency is different from real money, which may be earned or spent outside of particular embodiments. In particular embodiments, virtual currency may be issued by an operator, may have no physical analog, and may be primarily used in-game, in-tournament, or within the platform. In particular embodiments, a player may exchange real money for virtual currency, which may be spent, won, or lost in-game or within the platform. In particular embodiments, virtual currencies described herein may be coins, credits, or tokens that a player may win, lose, use, spend as consideration, or exchange in-game or within the platform. In particular embodiments, virtual currency may comprise bitcoin. In particular embodiments, virtual currency may be exchanged for real money.

In particular embodiments, pseudo-currency may be a special type of virtual currency that exists only within particular embodiments described herein. Pseudo-currency may be a digital currency that may be exchanged either for virtual currency, virtual goods, or real money. In particular embodiments, pseudo-currency may be held by an operator or facilitator, as opposed to a player wallet or bank. In particular embodiments, pseudo-currency may be used as a mechanism to facilitate conditional payments or transactions and may only be used for that purpose.

A virtual good may be any digital item that may be purchased, earned, won, used, or lost, in-game, on the platform, or within a virtual world. Virtual goods may include digital gifts, clothing or armor or weapons for avatars or in-game characters. Virtual goods may also include services, or bonuses available to a player's avatar or in-game character, team, or world. In particular embodiments, virtual goods may only be valuable inside the game or inside the platform, and may not be exchanged for real money.

A physical good may be not be real money or virtual currency, but may include things, such as t-shirts, games, hats, physical games, donations to charities, tickets to events, and other physical goods.

A payout may be the process of awarding operator consideration to one or more players who are deemed by the operator to have fulfilled the win condition. Particular embodiments comprise particular example mechanics of a payout process.

FIG. 1 illustrates an example method for evaluating player characteristics. In method 100, player characteristics are compared with a database of known conditions to determine eligibility to legally participate in a particular tournament and receive particular types of payouts. The comparison of characteristics to conditions must occur in order to distribute conditional payouts of operator consideration. Particular embodiments may repeat the steps of the method of FIG. 1, where appropriate. Moreover, although this disclosure describes and illustrates particular steps of the method of FIG. 1 as occurring in a particular order, the invention contemplates any suitable steps of the method of FIG. 1 occurring in any suitable order.

In particular example embodiments, a player must be verified across all verification metrics in order to participate in a pay-to-play or real money tournament. If a player is not verified by one or more of these metrics, they will be notified, and directed to free-to-play tournaments, or tournaments where prizes include virtual goods, but not real-money prizes. They will not be allowed to participate in any real money tournaments until they may be verified across all metrics.

In particular example embodiments, players will, as part of the terms of service, positively agree and consent to all verification efforts. Players will also confirm their agreement to terms of service. Players will confirm their identity and age, and will allow any and all efforts to verify their identity, location, age, and good-standing player status. In particular embodiments, a player will also agree to liability for any fraudulent claims or behaviors.

Particular embodiments allow operators to establish conditions that are consistent with local, state, and federal laws and regulations. Particular embodiments comprise one or more of location, age, and identity, and good standing player status verification.

To distribute operator consideration, an operator will take the characteristics of each of one or more players who have achieved the win condition and compare those player characteristics to a known set of conditions. In particular example embodiments, the conditions will be the eligibility criteria for receiving real money prizes in a video game tournament. In particular embodiments, an operator may evaluate player characteristics prior to entrance into a tournament, and may use those characteristics to determine eligibility for entrance into a particular tournament. Operators or facilitators may prevent players with certain characteristics from participating in some tournaments.

In particular embodiments, an operator may choose to evaluate characteristics after the win condition has been achieved. In particular embodiments, an operator or facilitator may evaluate the characteristics only of the winning players. In particular embodiments, an operator may evaluate every player who enters a tournament, including those that offer the player consideration and those that play free tournaments. In particular embodiments, a player signals an intent to play in a real money tournament. When a player "signals their intent" to play in a real money tournament, that player may trigger a verification process. In the event that a player "signals their intent" to play in a real money tournament, either by purchasing credits, or by attempting to enter a tournament with a posted buy-in and prize amount, that player may trigger a verification process, such as the verification process described in method 100.

In step 102, player characteristics are received from each player. Player characteristics may be received during the player's initial registration or following a tournament where the player has satisfied the win condition. This may happen by the player reporting their name, age, physical address, email address, and phone number at the time of registration or following the conclusion of a tournament. This information may also be received from a third party where a player registers through a preexisting account established by a third-party partner service, such as a Windows Live or Battle.net. This registration information may be used later when a player signals their intent to participate in a pay-to-play tournament. In particular embodiments, players will register for pay-to-play tournaments and will include, in their registration information, certain information that will allow them to file accurate tax statements based on the income that they earn or lose while participating in pay-to-play tournaments. This additional registration information may include a player's social security number, driver's license information, passport information, and payment information, including but not limited to bank account and or credit card information, which may be used to provide additional identity and age verification.

In step 104, an identity of a player is evaluated to determine eligibility. In particular embodiments, an operator may choose one or more methods for establishing and verifying player characteristics. In particular embodiments, an identity of a player is evaluated against a database of conditions to determine eligibility. Conditions may include, but are not limited to self-reporting, public records, social security number verification, tax ID identification, post office address files (PAF), electoral rolls, credit reference files, credit card numbers, biometric data, including fingerprints and facial recognition, or other methods of identity verification, IP verification, cell phone location, GPS, or other location verification tool. In particular embodiments, facial recognition may be achieved through a PC webcam, camera in a mobile device, camera in a gaming console, or camera in a console peripheral, such as Microsoft Kinect for Xbox. In particular embodiments, a fingerprint may be read at a scanner, mobile device, or any device capable of sensing a fingerprint. In particular embodiments, an identity of a player is evaluated using third party authorization. Third party authorization may include, but is not limited to, credit card verification, paypal, stripe, amazon payments, ripple, bitpay, windows live ID verification or other third party user ID, such as battle.net ID, email, a code on a phone, or other payment processor that allows payment in any currency issued by governments or any online currency. In particular embodiments, a player identity may be verified by requiring the player to respond to an email, text, or similar authorization by returning a code that may be sent to their cell phone, computer, or similar device within a certain time period.

In particular embodiments, if a player is determined to not be playing under their true identity, they will be notified of their failed verification and directed to the free-to-play tournaments. They will not be allowed to participate in any real money tournaments until they may be verified as playing under their true identity and that identity is established as verified by all other methods.

In particular embodiments, a player's identity may be verified by comparing player characteristics to a database of invalid players or players not in good standing who have been banned or in some way restricted from playing games or tournaments. If their IP address, user ID, known aliases, driver's license numbers, or other player characteristics are found to be on a list of banned players, they will be notified of their failed verification and directed to the free-to-play tournaments. An invalid player will not be allowed to participate in real money tournaments until they may be verified as playing under their true identity, their identity is established as verified by all other methods, and their ban has been lifted.

In particular embodiments, where a real money or virtual currency operator consideration is available as a potential prize, player characteristics will be established and recorded as part of tournament play. In particular embodiments, player characteristics will be determined alongside each game and tournament to confirm eligibility.

In step 106, an age of the player is evaluated against a database of conditions to determine eligibility. An age characteristic of a player depends on the date that they were born and comprises their legal age. Conditions may include a legal age in a particular jurisdiction where a player is permitted to participate in particular tournaments, such as a pay-to-play tournament. Particular embodiments may evaluate a player's age against a third party database. Particular embodiments comprise different methods of verifying age that may be the same or similar to identity verification of step 104, such as self-reporting, social security number verification, or tax ID identification, post office address files (PAF), electoral rolls, credit reference files, or other methods of identity and age verification.

In step 108, a location of the player is evaluated against a database of conditions to determine eligibility. In particular embodiments, an operator may use a multi-stage location verification by incorporating multiple methods of location identification and verification, which may include combinations of many methods well known in the industry. Location characteristics of a player that an operator may identify include, but are not limited to, IP address, GPS coordinates, cell tower location, Wi-Fi triangulations, geofencing, Bluetooth, RFID, or TV tower location. Conditions may include eligible locations and ineligible locations based on laws and regulations of a particular jurisdiction.

In step 110, a good-standing of a player is evaluated against a database of conditions to determine eligibility. In particular embodiments, a player may be in a state of not good-standing, which means that they may be on a list of banned players or groups. In particular embodiments, one or more players or groups may be banned from participating in any tournaments due to fraud, disruptive behavior, or for any other reason. Fraudulent behavior or violating the terms of service are considered harmful to other players. Banning one or more players or groups is solely in the discretion of an operator or facilitator.

In particular embodiments, a player may be eligible or ineligible to participate in a tournament or receive a particular payout of operator consideration. In step 112, a player receives an eligibility determination if their player characteristics have satisfied the identity, location, and age conditions. In step 114, a player receives an ineligibility determination if their player characters have not satisfied one or both of the location and age conditions.

In particular embodiments, a player may play free-to-play games. In the event that a player signals their intent to participate in real money tournaments, as opposed to free-to-play games, either by purchasing credits through any native or third party payment processing system, or by attempting to enter a tournament that has a clearly posted buy-in and prize amount that is to be paid in credits that may be exchanged for real money, a player's eligibility will be verified. A signal of intent to participate in a real money tournament will trigger multiple API calls to one or more native servers, databases, third party services, or third party servers to verify one or more player characteristics. If a player is determined to be operating outside of any legal location they will be notified of their failed verification and directed to the free-to-play tournaments, and they will not be allowed to participate in real money tournaments until they may be verified as playing in a legal location.

In particular example embodiments an operator offers a real-money tournament and has chosen to establish conditions around age and location. For location, the operator uses a two-stage verification process including IP verification and cellular tower location. Information on a player's age and location will be stored and compared with a database of known legal locations. Any ineligibility determination with respect to location will result in a virtual goods payout, including downloadable content, as opposed to a real money payout. This player will not be allowed to participate in real money tournaments until they are verified as playing in a legal location and are of legal age. For age, the operator uses a native age verification service or protocol, or a third party age verification service. These protocols or services may compare certain information (age reported by player, age reported to credit card company, social security information, driver's license information, etc.) collected as part of the registration information or alternate registration information against known databases such as may be owned by the credit card companies, department of motor vehicles, a country's state department, or social security administration. A player's reported and confirmed age will then be combined with their position-location information to determine if the player may legally participate in real money tournaments. If a player is determined to be operating below the legal age limit for their jurisdiction, they will be notified of their failed verification and directed to the free-to-play tournaments. They will not be allowed to participate in real money tournaments until they may be verified as playing in a legal location and that they are above the legal age limit for that location.

Figure 2:
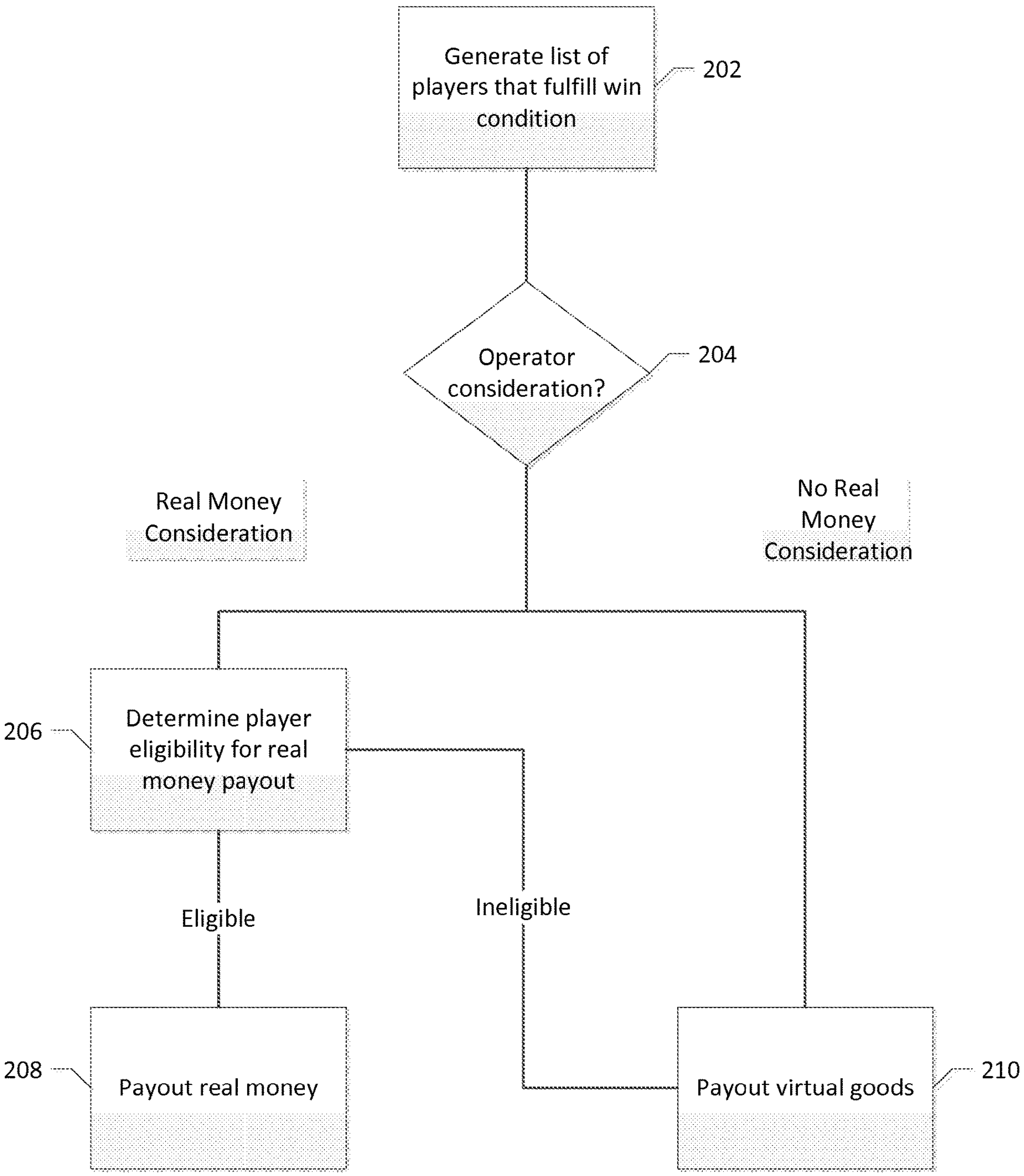
FIG. 2 illustrates an example embodiment of a payout process.

FIG. 2 illustrates an example embodiment of a payout process. In the example embodiment of FIG. 2, the operator has elected to evaluate player characteristics upon completion or resolution of a tournament. However, in other example embodiments, an operator may evaluate player characteristics as a condition of entry into a tournament, as opposed to a tournament's conclusion.

In step 202, a list of players that fulfill the win condition is generated. Depending on the type of game or tournament, the list may comprise one or more players or groups. In step 204, operator consideration is determined for a given tournament.

In step 206, a player's eligibility is determined for a real money payment according to the method 100 described in FIG. 1. In particular embodiments, where a team comprises two or more players, each player's eligibility is evaluated separately, such that two different players on the same team could each receive separate types of prizes based on how their individual characteristics were evaluated against a set of pre-determined conditions.

In step 208, for any one or more players eligible to receive a real money payout, a payout of real money is issued. In step 210, for any one or more players ineligible to receive a real money payout, a payout of virtual goods is issued.

Figure 3:
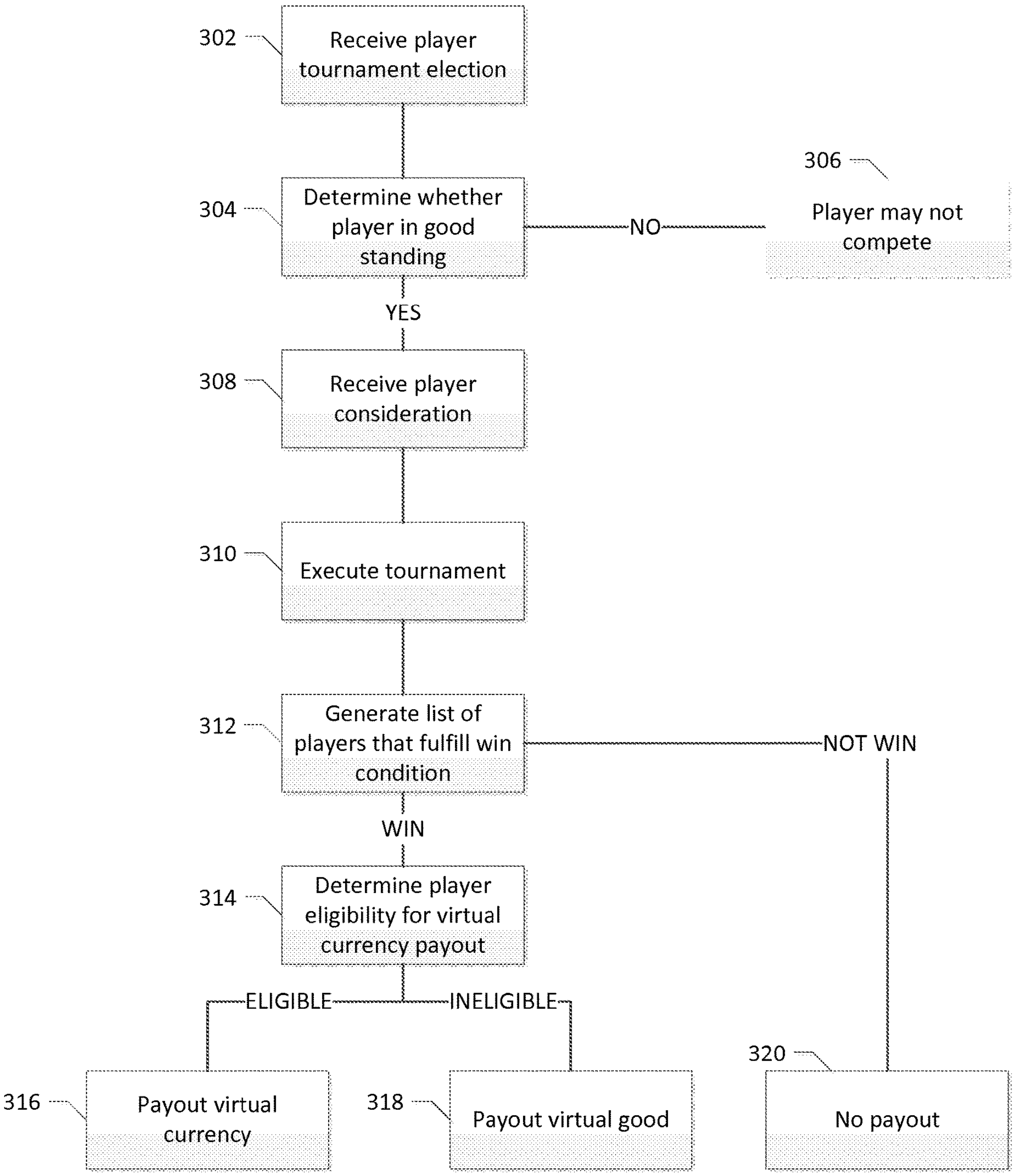
FIG. 3 illustrates an example tournament embodiment.

FIG. 3 illustrates an example tournament embodiment. In particular embodiments, method 300 comprises one or more steps of receiving one or more player tournament elections, determining whether a player is in good standing and eligible to play in the tournament, receiving player consideration, executing a tournament, generating a list of one or more players that have fulfilled a win condition, and for a winning player determining player eligibility to receive a real money payout. Particular embodiments may repeat the steps of the method of FIG. 3, where appropriate. Moreover, although this disclosure describes and illustrates particular steps of the method of FIG. 3 as occurring in a particular order, the invention contemplates any suitable steps of the method of FIG. 3 occurring in any suitable order.

In particular embodiments, every player, regardless of their characteristics, may participate in a tournament and potentially receive valuable prizes. Particular embodiments allow all eligible players to contribute player consideration to enter tournaments and allow all players who complete the win condition to receive operator consideration. An operator may offer players an opportunity to participate in a tournament of a given game. In particular embodiments, an operator would make clear the conditions of the game, including the win condition, along with the player's consideration that would be required of any participating player, as well as the operator consideration that would be earned by the one or more players who achieve the win condition. In step 302, a player's election to participate in a tournament is received.

In step 304, a player's eligibility is determined. That is, whether a player is in good standing and eligible to play a particular game or tournament. Method 100, as described in FIG. 1, further illustrates particular embodiments of determine whether a player is in good standing for a particular game or tournament. In particular embodiments, an operator will choose to evaluate player characteristics at step 304, prior to allowing the player the opportunity to offer the player consideration. In particular embodiments, an operator will evaluate player characteristics during or after the conclusion of the game or tournament. In step 306, where a player has been determined to be ineligible to compete, they may not compete in the game or tournament.

In step 308, player consideration is received. In particular embodiments, one or more players choosing to participate in a tournament offer the player consideration to the operator. In particular embodiments, once a player has paid the player consideration, they may add or withdraw credits, invite other players to join the tournament to compete, participate in tournaments, and communicate with other players. In particular embodiments, instead of receiving player consideration, an operator may choose to use a tournament or player matching technique to fill a tournament with other players or virtual players. In particular embodiments, invitations and matching may occur in a virtual lobby, or through messages delivered to a player profile page or through messages delivered directly to a player via text message, email, phone call, or some other system. In particular embodiments, a native or third party service may be used for tournament-matching or matchmaking. From that point, the player may add or withdraw "credits," join tournaments, invite other players, communicate with other players, and participate in tournaments.

Once a tournament is full and all players have paid their consideration to join, the game begins, players play, and their performance is recorded. Those players who are deemed to not fulfill the win condition will not be eligible for the operator's consideration and will not be the focus of this system. Instead, this system deals with the winners—those players who are deemed by the operator to have fulfilled the win condition of the game. In particular embodiments, characteristics may also be evaluated, determined, and recorded only among the winners at this point in the process.

In step 310, a tournament is executed. Particular embodiments may run both synchronous and asynchronous games. In particular embodiments, a tournament that awards the prize to more than one participant operates in the same manner as any of 2-participant tournament, the only change is in the assignment of more than just one winner and the splitting of the payout. In particular embodiments, an operator tracks and records the performance of the players within the game or tournament.

In particular example embodiments of step 310, the role of chance may be decreased in the execution of a tournament in one or more methodologies described below, or any combination thereof, thereby increasing skill-based results. In particular embodiments the role of chance may be decreased at a tournament by lowering the impact of random numbers across multiple players competing in the same game-type in a given tournament. As will be described in particular embodiments below, the role of chance may be decreased in asynchronous tournaments.

Particular embodiments may continuously evaluate players, hardware, and software in a given video game tournament with the intent of notifying all players of any inconsistencies in hardware and software among all tournament participants. Particular embodiments may also synchronize elements that create randomness in games, like for example random number generators, across each player's experience such that each player has the same set of pseudo-random events driving their gaming experience. The result is a game experience where each player experiences the same level of randomness. Eliminating the differences in randomness removes an element of unfairness coming from different randomness. The result is a tournament where each participant will play their game, as much as possible, on a level playing field. Given that each player in a tournament is subject to the same inputs and experiences, the outcome of the tournament becomes more dominated by skill even if the individual game contains large elements of chance.

In particular example embodiments, in asynchronous game play, there may be a random number generation (RNG) component. Random number generators may influence the outcome of a particular game. In particular embodiments, the presence or absence of random numbers as they relate to gameplay is evaluated. Particular random number generators may influence a variety of elements in a game, including: the number, position, and/or strength of non-player (or non-human) enemies/characters; configurations of elements (walls, trees, mountains) in a field of play; number, position, and strength of weapons and found items in a given field of play; number, position, and strength of certain power-ups, traps, bonuses, coins, treasures, pitfalls; number, position, location, and order of certain pieces and or clues given to players, such as the order of pieces in Tetris or Bejeweled; and the conditions and positions of respawn points.

Particular embodiments synchronize the random numbers across multiple players. Even though chance plays a role in the outcome, every player is subject to the same chances as every other player. The quantity or amount of influence of RNG within a game is evaluated and established. Particular games may not generate their own random numbers, and are required to request needed random numbers. Then each game in a particular tournament receives the same stream or block of random number values. Games may request as many random numbers from each stream as they need. By synchronizing the random number sets in this way, the system will have decreased the role of chance at the tournament level even though at the game level the RNGs still play a role.

In particular example embodiments, it may be that in a given game, a random number generator (RNG) determines the number and strength of a given set of non-human enemies in a given room. For example, there may be anywhere from 1-10 enemies that may each be a skill level one to five. In particular embodiments, if one player encounters 4 enemies that are each level two in a particular room, all other players upon entering the room will also see 4 level two enemies instead of an alternate number of enemies with varying skill levels. In particular embodiments, a game may have a stream of elements governed by an RNG that the player must incorporate into their gameplay, such as the pieces in Tetris. In particular embodiments, if one player receives pieces in a given order, such as a long straight piece, square, square, and "L" piece, then every player in that tournament would receive the same pieces in the same order, long straight piece, square, square, and "L" piece. Even if chance plays a role in any individual game, chance may be reduced at the tournament level—even to the point where chance may no longer be a determining factor in the outcome of the tournament.

In particular embodiments, another deciding factor for the outcome of skill-based games are the underlying technical hardware. Depending on the type of game, players with a faster internet connection or superior hardware might gain advantages, for example by being able to recognize important game elements earlier, which would allow them to react earlier or have more time to think. Part of a player's profile that is used to match them up in tournaments is a description of their technical platform, in particular their current hardware, software, peripherals, and internet connection speed. The player's profile includes: whether players are playing on consoles, PCs, Macs, or mobile devices, including which brands and which versions of a device they are using; whether they are controlling with joysticks, keyboards, mice, or wireless controllers, including which brands and which versions of device they are using; what version of the game each player is using; and what settings they are using, especially if those settings may speed up processing time and allow players to gain advantage by moving through the environment faster or reacting faster to stimuli in the game. An internet speed test and a processor speed test may be performed to determine if there are inconsistencies with the rate at which players will receive access to game information. Particular embodiments record all of this data for analysis and notification.

In particular embodiments, there may be a hardware-software-peripheral notification component that notifies each player of any differences in the underlying technical hardware that they are using or that other players are using. These notifications may come via web view, email, text message, or similar. Players then have the option to continue into the tournament or opt-out of the tournament. This may be done either before or after the player has posted their buy-in amount at which point some or all of their buy-in may be returned.

In particular example embodiments, the role of chance may be decreased in a particular tournament by notifying all players of the inconsistencies in both hardware and software configuration between every player in a given tournament. This notification may be sent prior to every player agreeing to participate in the tournament, allowing each player to decide if they want to participate in a tournament with other players who may have a material advantage in the outcome of the game because of superior hardware, software, or settings. In particular example embodiments, a player may be notified within the graphical user interfaces or user experiences described below. In particular example embodiments, a player may be notified by email, text, or similar type of notification.

In particular embodiments, there may be a hardware-software-peripheral equalization component that artificially equalizes each player's hardware-software-peripheral so that each player's experience appears exactly the same. In particular embodiments, the equalization component may lag a feed to a faster player. In particular example embodiments, the equalization component may lag an internet feed to a player with a faster internet connection. In particular example embodiments, the equalization component may lag a hardware, software, or peripheral feed to a player with a faster hardware, software, or peripheral. In particular embodiments, the equalization component may be operated by the tournament operator, one or more servers, one or more clients, and one or more applications or components of the one or more servers or clients.

In particular embodiments, there may be a record and replay component for analytics, data mining, and fraud-prevention. Particular embodiments record and store all game conditions, including maps, levels, characters, avatars, win conditions, buy in amounts, prize amounts numbers of players, as well as each player's commands. Each player's commands must be replayable by each game, thereby allowing the operator to better identify fraudulent behavior or allowing other players, game developers, spectators, YouTube viewers, and many others to evaluate a player's performance. In particular embodiments, each player's commands may be replayed thousands of times with minor adjustments to each individual game condition, in a Monte Carlo Simulation analysis. This type of analysis allows administrators and game designers to better evaluate the game, as well as the role of each condition in determining the outcome. A Monte Carlo Simulation of this type would not only help to decrease fraud, but would also allow game designers and developers a great deal of insight into how their games work, eliminating chance elements at the game level.

In particular example embodiments, the role of chance may be decreased in a particular tournament by recording all players' commands throughout each of their game instances. Particular embodiments then replay each game one or more times using the exact same commands with slight variations in parameters and timing to measure the differences in game play. This recording and replaying may analyze the degree of chance in each tournament as well as decrease fraud.

In particular embodiments, players' scores and their gameplay are recorded and stored for the purposes of determining the winner of the specific tournament.

In step 312, upon completion of a game or tournament, a list is generated of one or more players or teams that have fulfilled the win condition for a particular game or tournament. In particular embodiments, they are given the designation of winner of that specific game or tournament. In particular embodiments, a player with a winning designation would receive operator consideration. In particular embodiments, a native or third party service may be used for tax documentation, for any big-data reporting, for recording or reporting a player's earnings or losses, or for analytics based on player behavior.

In step 314, a player's eligibility to receive a particular payout is determined according to method 100 described in FIG. 1 for all a player's that have achieved a win condition. Particular embodiments allow operator consideration to be distributed to one or more players automatically based on individual player characteristics. In step 320, for any players that have not achieved a win condition, the player will receive no payout of operator consideration.

In particular embodiments an operator is able to pay out multiple types of tournament winnings to multiple players, who themselves may have a variety of unique eligibility characteristics. For example, using this system, players playing in jurisdictions that forbid real-money gaming will be able to play alongside players who are playing in eligible jurisdictions at the same time, in the same game or tournament. This system will allow operators to offer different prizes to different players based on their individual eligibility.

After the game, the players will each be given a notification, such as email, text, push, or web-view notification, of where they finished in the tournament, along with a transfer of funds to their account if they were among the prize winners. Players will always have access to free games, and will have the opportunity to return to the original game as well, playing it outside of Versus mode, such as non-Versus mode. They may also return to the Versus Web Server and choose another game.

In step 316, a payout of real money or virtual currency is made to one or more players. In step 318, a payout of a virtual good or goods is made to one or more players. In particular embodiments, when a player in good standing chooses to pay the player's consideration, they are made eligible to receive some operator consideration from that tournament. In particular embodiments, players may express a preference for virtual currency or virtual goods in the event that should they become the tournament's winner, based on the fulfillment of the win condition. In the event that the player has expressed a preference for receiving virtual currency prizes, then provided they meet all of the eligibility characteristics, and they have been declared the winner, then when tournament prizes/operator's considerations are distributed, the winning player would receive the posted virtual currency prize amount (in this case, 0.15 Bitcoin). If the Player does not fulfill all eligibility characteristics, the player would instead be awarded the listed virtual goods award (in this case, two "gold bars").

As in previous examples, tournament prizes may be shown as both an amount of virtual currency, as well as one or more virtual or physical goods. The format of the award is determined based on the winning player's eligibility. If the winning player meets all of the eligibility characteristics, they may elect to receive the award as virtual currency. If any of the checks fail, including, but not limited to age, location, eligibility, history, criminal background, or any other characteristic that fails to fulfill the conditions for virtual currency payout/consideration, then that player's characteristics may be evaluated again against a separate set of conditions to determine their eligibility to receive physical goods. If they fail any of the physical goods conditions, they player will be evaluated to determine eligibility to receive the award/operator consideration in the form of a virtual good or goods.

In particular example embodiments where a player is deemed by the operator to have fulfilled the win condition, is awarded pseudo currency. In either case, the designation or the pseudo currency will be used along with the conditions to establish the payout process. All players who have been deemed to meet the win condition would "receive" an amount of pseudo currency commensurate with the amount of operator consideration. The winning players would "hold" this pseudo currency not in their player-facing wallets, but among their unique Player Identity data. In either case, the transition from designation or pseudo currency into either real money or virtual good will happen after the comparison of characteristics and conditions. The comparison of characteristics and conditions may come at any point in this process, but in particular embodiments, it occurs after the player has won and before they have received the operator consideration that is commensurate with their eligibility status.

In particular example embodiments, Player A is eligible for real money or virtual currency payouts. Player A may pay a 100 token entry fee to enter a 10-person, simultaneous-play, individual outcome tournament where the posted win condition is of the high score and timed type where the top three players with the highest scores after 10 minutes will be awarded prizes commensurate with their finish. The first-place finisher will receive either 500 tokens or two "rare items" to be used in-game; the second-place finisher will receive either 300 tokens or one "rare item" to be used in-game, and the third-place finisher will receive 150 tokens or one "common magical item" to be used in-game. Player A may have the following characteristics: birthdate—Dec. 3, 1977; current location by IP address 104.33.82.19, Los Angeles, Calif., USA; current location by cell tower ID—cell ID: 22607, latitude: 34.057710, longitude: −118.445420; eligibility status: good; preferred payout method—real money, or its virtual currency equivalent, where available. Player A may then play the tournament, completing the win condition with the highest score as the first-place winner. Player A's characteristics may then be measured and compared to a known list of conditions—California is a state where players older than 18 years of age and in good standing may receive real money payouts for participation in tournaments featuring games of skill. Comparing Player A's current characteristics to a database of conditions may yield the result that a real money payout is both possible and preferred by the player. This information would be combined with the player identity to trigger a real money payout of 500 tokens into Player A's wallet. Player A, with the designation of first place winner, combined with the designation allowing a real money payout based on Player A's eligibility condition, would allow the operator, either through an automated process, or through a manual approval system, to release either real money or a virtual currency in the amount consistent with the operator consideration of 500 tokens into Player A's wallet. Once the 500 tokens are in Player A's wallet, Player A could withdraw, spend, or exchange the real money or virtual currency. Where Player A has been given pseudo currency by the operator in exchange for meeting the win condition, the comparison of characteristics and conditions would trigger an automated exchange of pseudo currency into either virtual currency or real money at an exchange rate consistent with the Player A receiving the full amount of the operator consideration. In particular example embodiments, the operator may approve all exchanges of pseudo currency for either virtual currency or real money.

In particular example embodiments, Player B is not eligible for real money or virtual currency payouts, and may only receive virtual or physical goods. Player B is a member of a 5-person team who must submit a 500 credit player consideration (either paying 100 credits per player as individuals or by having a single payer, or alternate combination of payers contribute the player consideration of 500 credits), to enter a Multiplayer Online Battle Arena type game where the win condition is of the "Capture and Control Territory/Capture the Flag" type. The first of two teams to control certain positions on a map, will be deemed the winner. The posted prize for the winning team is apportioned on a per-player basis and is either 175 credits per winning team member or a suit of battle armor that may be used in game. Player B has the following characteristics: birthdate—Dec. 3, 2006; current location by IP address 108.33.82.19, Nashville, Tenn., USA; current location by cell tower ID—cell ID: 206287083, latitude: 36.148170, longitude: —86.812980; eligibility status: good; preferred payout method—real money, or virtual currency equivalent where available. Player B plays in the tournament and his team fulfills the win condition, winning the game. Characteristics for all 5 of the winning players are evaluated, including Player B, to determine eligibility for virtual goods or virtual currency. Player B's characteristics are evaluated independently from all the other players on Player B's team. Player B's characteristics are compared to a list of conditions. Tennessee is a state where no players, regardless of age or standing, may receive real money payouts for participation in tournaments featuring games of skill. Comparing Player B's current characteristics to a database of conditions yields the result that a real money or virtual currency payout are not possible. Thus, combining this information with Player B's player identity triggers a payout for Player B in virtual goods, such as the battle armor. If the other four players are each deemed eligible for real money payouts, it is possible that there would be four players who would each receive 175 credits, while Player B receives the battle armor. Where Player B has the designation of winner, that designation, combined with the designation confirming a virtual good payout, allows the operator, either through an automated process, or through a manual approval system, to release a virtual good or virtual good in the amount consistent with the operator consideration into Player B's wallet where the player could use that virtual good in-game or in-platform, but could not exchange that virtual good for real money or virtual currency. In particular example embodiments where Player B has been given an amount of pseudo currency by the operator in exchange for meeting the win condition, the comparison of characteristics and conditions would trigger an automated exchange of pseudo currency into an amount of virtual good or virtual goods at an exchange rate consistent with the player receiving the full amount of the operator consideration. In particular example embodiments, the operator must approve all exchanges of pseudo currency for virtual goods.

In particular example embodiments, Player C is eligible for a virtual currency award when receiving a tournament payout where pseudo currency is unavailable. Player C pays 0.05 bitcoin to enter a four player, asynchronous, individual outcome tournament where the posted win condition is of the "puzzle" type where the first player to correctly solve a puzzle will be awarded either 0.15 Bitcoin or two "gold bars" that may be used within the operator's massive multiplayer online game. Player C is a player in good standing that has participated in real money tournaments on the platform previously. Player C maintains a positive balance of virtual currency in their wallet and they have indicated that they prefer to receive tournament prize awards in virtual currency. Player C may choose to use a portion of their existing virtual currency balance to pay the entrance fee for a tournament, playing against some number of additional players who may or may not be eligible for real money payouts. Operator consideration may be described to players prior to the player entering the tournament as either an amount of virtual currency, or one or more virtual goods. For example, players including Player C may receive messaging similar to the following: "This tournament requires an entry fee of 0.05 bitcoin. The winner will receive either 0.15 Bitcoin, or two "gold bars" for use in OperatorWorld, a massive multiplayer online game world created by the operator, depending on eligibility." Player C has fulfilled the win condition and has been designated the sole winner of this tournament. As a result, Player C will be awarded either virtual currency or virtual goods depending upon the verification of their conditions, such as age, IP address, and cell phone latitude/longitude, based on the current state of Player C's conditions during the time that they participated in the tournament. Player C's birthdate and age characteristic is Dec. 3, 1977. Since Player C's age is greater than or equal to the legal age condition for participation in real money tournaments in the jurisdiction where Player C is playing, then Player C may be eligible to receive a virtual currency consideration. Player C's IP address is 104.33.82.19 (near Los Angeles, Calif., USA). Since Player C's IP address represents a computer located in a state that allows real money payouts, they are still eligible to receive their tournament award in virtual currency. Player C's cell phone latitude/longitude characteristic is cell ID: 22607, latitude: 34.057710, longitude: −118.445420 (near Los Angeles, Calif., USA). Since Player C's cell phone is determined to be located in a state that allows real money payouts, then Player C may still be eligible to receive their tournament award in virtual currency. If, and only if, all of the preceding characteristic checks evaluate as true will Player C be deemed fully eligible to receive this tournament award in virtual currency. The system then transfers an amount of virtual currency equal to the tournament operator's consideration (0.15 Bitcoin) into Player C's wallet.

In particular example embodiments, Player D is not eligible for a virtual currency award as a tournament prize payout, there is no pseudo currency, but there is a physical good option. Player D, a player in good standing, has indicated they would prefer to receive a tournament prize payout in virtual currency, if possible, and physical goods as a second option, followed by virtual goods as a third option. Player D pays the $5 posted player consideration using real money and enters into a two-person tournament where the win condition is of the "resource acquisition" and "timed game" type, where the player who accumulates the most gems in 2 minutes, wins the game. The operator consideration is posted as $7.50, a Limited Edition Operator Logo T-Shirt, or a Virtual Battle Axe, which may be used in-game. In the event that Player D has been designated the sole Winner of this tournament, they will be awarded a prize. Player D's eligibility is checked against Player D's characteristics. Player D's birthdate characteristic is Dec. 3, 1977. Since Player D's age is greater than or equal to the minimum allowable age, Player D is eligible to receive a virtual currency award. Player D's IP address characteristic: 108.33.82.19 (near Nashville, Tenn., USA). Since Player D's IP address represents a computer located in a state that does not allow real money payouts, Player D is not eligible to receive their tournament award in virtual currency or physical goods. Thus, Player D is only eligible to receive a payout in the form of virtual goods. While in some example embodiments, Player D's expressed preference for physical goods over virtual goods would allow the operator to provide the Limited Edition Operator Logo T-Shirt to Player D, in particular example embodiments, Player D would be ineligible for the T-Shirt and would receive the Battle Axe to be used in-game.

In particular example embodiments, participants agree to engage in a conditional transaction. Two or more participants enter into a contract where the outcome of that contract will be a payout to one or more of the participants, pending an unknown outcome. In the same way that players enter into a tournament, run by an operator or facilitator, and receive a payout upon completion of a win condition; in particular embodiments, players enter into a contract that is governed or written or arbitrated by a third-party operator. The win condition that marks the completion of the contract, may not be any of the game types described above, but instead some alternate win condition that is known to all participants, agreed to through a player paying the player consideration, and governed by an operator. In particular embodiments, the prize may be some real money, virtual good, or physical good that must, for a variety of reasons (legal, regulatory, or by mutual agreement) be held in escrow by the operator, to be distributed to one of the players or their beneficiaries upon completion of the win condition.

Figure 4:
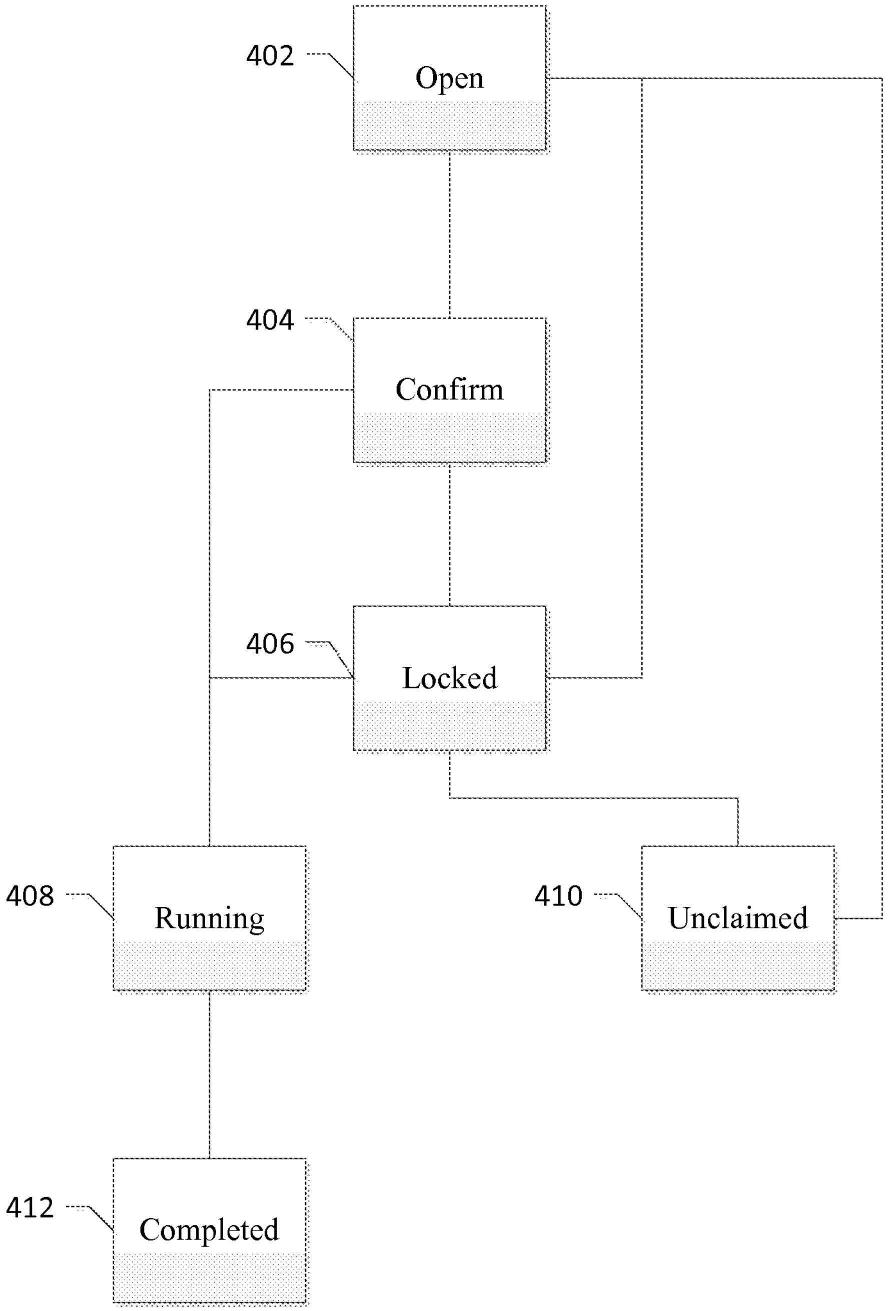
FIG. 4 illustrates example tournament stages and commands.
Figure 5:
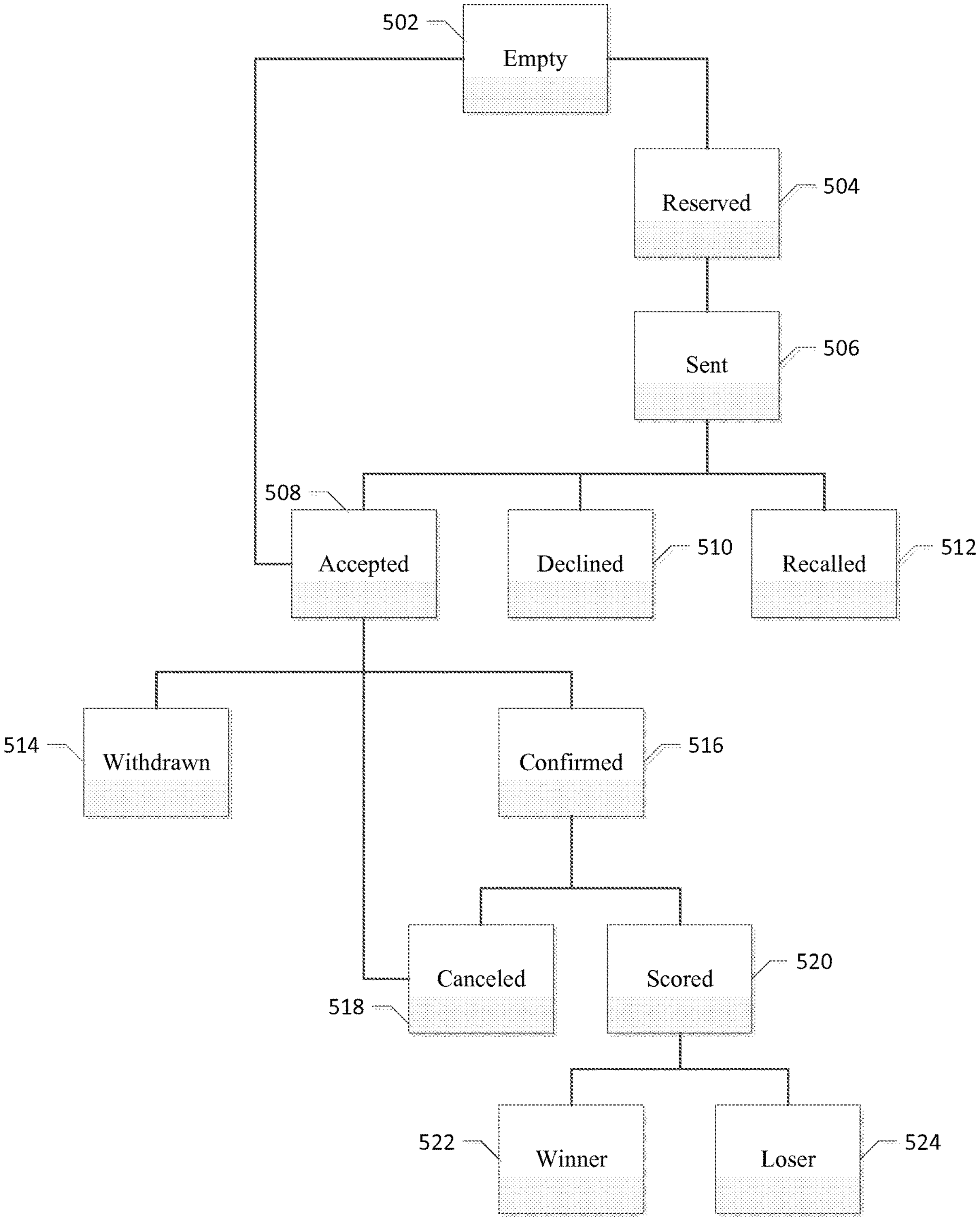
FIG. 5 illustrates example invitation stages and commands.

FIG. 4 illustrates example tournament stages and commands. FIG. 5 illustrates example invitation stages and commands. The example tournament stages and commands, as well as the example invitation stages and commands may occur separately or interchangeably. In particular embodiments, the interchangeable operation of example tournament stages and commands illustrated in FIG. 4 and example invitation stages and commands illustrated in FIG. 5 may occur as multiple invitation slots associated with a particular tournament transition between stages in FIG. 4, it may also cause a particular tournament to transition between its stages illustrated in FIG. 4 simultaneously. In particular embodiments, the stages illustrated in FIGS. 4-5 may be user facing stages or non-user-facing, back-end stages.

Particular example embodiments comprise players agreeing to participate in a tournament. Particular example embodiments comprise 2 invitations or player slots. Particular example embodiments may be made to scale to any combination of number of players for a particular tournament, as well as team vs. team or team vs. team vs. team tournaments, or any number of teams vs. teams, where multiple players may play cooperatively on a team, ultimately splitting any prizes with their team members. In particular embodiments, a tournament that awards the prize to more than one participant operates in the same manner as any of 2-participant tournament in terms of tournament and invitation slot progression.

In particular example embodiments, there may be a tournament where Player 1 invites Player 2. A tournament may begin in the open stage 402, which is the case for all tournaments. Player 1 may see a tournament that is in open stage 402. Player 1 may select a tournament that is in open stage 402, and Player 1 would see that both invitation slots are in the empty stage 502. In particular embodiments, Player 1 performs the join command on one of these open player slots. Assuming Player 1 pays the tournament's buy-in amount, that player slot then moves to the accepted stage 508. In particular embodiments, as soon a tournament receives its first accepted invitation slot, it is sent the lock command, and enters locked stage 406. In addition to the locked command moving the tournament to the locked stage 406, thus removing it from view by other players, it also finds all remaining empty slots in the tournament and sends each of them the reserve command, thus the tournament also enters the reserved stage 504 for the remaining empty player slots. This series of changes results in Player 1 being given control over the second player slot at reserved stage 504 in the tournament.

In particular embodiments, Player 1 uses control over the second player slot to indicate that they wish a particular Player 2 to fill that slot. Player 1 assigns Player 2 to the second slot by entering player characteristics for a particular Player 2 and sending the particular Player 2 the invitation using the invite command, which moves the second player slot to the invite sent stage 506. Player 2 receives an invitation letting them know they've been sent an invitation to a tournament from Player 1. When the particular Player 2 views the invitation, they are presented with two command options: "Accept" or "Decline." If the particular Player 2 chooses to decline the invitation, the invitation is moved to declined stage 510. Player 1 receives notification of Player 2's decline and an empty invitation slot is added to the tournament. This allows Player 1 to choose another particular Player 2 to invite to the tournament. If Player 2 chooses to accept, and they pay the buy-in amount, the second invitation slot is moved to accepted stage 508.

In particular embodiments, Player 1 may rescind the invitation that was sent to a particular Player 2. In particular embodiments, a tournament operator may rescind the invitation that was sent to a particular Player 2. In particular embodiments, when an invitation to participate in a tournament is rescinded a recall command may be sent and the tournament may enter recalled stage 522.

In particular embodiments, acceptance of the invitation by a particular second Player of a two-player tournament begins a rapid set of stage transitions for the tournament and the invitation slots. Once any tournament has filled up, meaning that all of its slots have reached the accepted stage 508, the tournament may be sent the confirm command and moved to the confirmed stage 516.

In particular embodiments, there may be a special case of a locked tournament, where the tournament never left the Player 1's control after achieving a full set of accepted slots and was in locked stage 406. In this embodiment, the tournament is sent the auto run command, which immediately moves tournament to running stage 408 and all of the accepted slots are moved to confirmed stage 516.

In particular embodiments, the tournament is now ready to receive scores from the game. The two players are notified that the tournament may now receive scores. The players are each shown a "Play Now" button, which once selected by each Player will signal their intent to play a session of a game from which their score will be captured and sent to the tournament. As each score comes in, the specific player's slot is sent the score command, which saves the player's score and moves their player slot to the scored stage 520. Once all of the previously confirmed slots have become scored, the tournament is sent the complete command and the tournament enters completed stage 412. The saved scores are now evaluated for all of the players, to determine the winner. The winning player's slot comprising the winning player, either Player 1 or Player 2 of a two-player tournament, is sent the win command, in which that player's account is awarded the tournament's prize amount at winner stage 522. The non-winning player's slot, comprising either Player 1 or Player 2 of a two-player tournament, is sent the lose command, and enters loser stage 524. In particular embodiments winner stage 522 and loser stage 524 may be user facing.

In particular embodiments, the remainder of the collected credits, including any amount not awarded to one or more players as the tournament's prize, are distributed between any operators and facilitators.

In particular example embodiments, there may be a tournament where Player 1 and Player 2 are not invited, but choose to enter the same tournament. In particular embodiments, Player 1 may still perform a join command, transitioning from empty stage 502 to accepted stage 508. Once the second player slot enters reserved stage 504, Player 1, instead of directly inviting a particular second player to participate in the tournament, releases their hold on the second slot. Once released by Player 1, also a controlling player, the second player slot of the two-player tournament may then transition from reserved stage 504 to empty stage 502. In addition, the tournament is sent the open command, which places the tournament back into open stage 402 from locked stage 406, and back in the list of tournaments available for any other player to enter.

In particular embodiments, any other Player 2 may choose to enter the same tournament and perform their own join command on the remaining empty player slot. Once another Player 2 has entered the tournament, and the tournament that has a full complement of accepted slots and all player slots are in accepted stage 508, the confirm command is sent and the tournament enters confirmed stage 516.

In particular example embodiments where a tournament is an open tournament, sending the confirm command moves the tournament into confirmed stage 516, where it remains, until each player indicates whether they want to proceed. In particular embodiments, a tournament may simultaneously reside in confirmed stage 516 and confirm stage 404. In particular embodiments, confirmed stage 516 may be non-user facing and confirmed stage 404 may be user facing.

In particular embodiments, Players in a confirmed tournament receive notification that they must choose to "Confirm" or "Cancel" their invitation slots, before the tournament may continue. If all players choose to confirm, a start command may be sent, and the tournament may proceed from confirm stage 404 to running stage 408. In particular embodiments, once a tournament is in running stage 408, the same scoring and completing process described above, occurs. In particular embodiments, once a tournament is completed, which may follow scoring and assigning one or more winners or losers, the tournament may enter completed stage 412.

In particular embodiments, if one or more players choose to "Cancel," their invitation slot, then the tournament may or may not be able to run with the remaining set of accepted players, and may enter unclaimed stage 410. Unclaimed stage 410 may be non-use facing. A tournament may reside in unclaimed stage 410 momentarily or for a longer period of time. In particular embodiments, a tournament may reside in unclaimed stage 410 prior to a tournament being cancelled. For a tournament unable to run with the remaining set of accepted players, a reset command is sent and the tournament enters canceled stage 518. In particular embodiments, for all remaining accepted or confirmed player slots, each remaining player in each of those slots receives a "Cancel" message. In particular embodiments when the tournament is canceled for an insufficient number of players, a reopen commend is sent and the tournament moves back to open stage 402 and a new set of empty slots is generated. In particular embodiments, a tournament may reside in unclaimed stage 410 prior to a tournament being reclaimed and going back to locked stage 406. For a tournament that is able to run with the remaining set of accepted players, a reclaim command is sent and the tournament enters locked stage 406.

In particular example embodiments, there may be tournaments where two groups of players compete against each other, such as in a Multiplayer Online Battle Arena ("MOBA"). A style of competitive game-play that has been rapidly increasing in popularity are *Battle Arena*, or MOBA-style games. These games allow groups of players to form teams, clans, tribes or guilds either with other players or with game-generated non-player characters (NPCs). These teams or groups then may engage in some form of battle against another group. Particular example embodiments comprising MOBA tournaments may proceed through the same sets of stages described above in FIG. 4 and FIG. 5.

In particular example embodiments comprising MOBA, there may be particular distinctions at various stages. In particular embodiments, distinctions may occur between empty stage 502 and accepted stage 508 when a group is joins an invitation slot. In particular embodiments, for a tournament with a non-zero buy-in amount, not only does the group's controlling or proxy player need to be in an approved real-money location, but all of the group's members that will participate in the tournament must be in approved locations. The tournament's buy-in is then supplied by all of the participating players, split equally among the participating players.

In particular embodiments comprising MOBA, one or more players may choose to withdraw from participation in a particular tournament. In particular embodiments, when Players in a MOBA confirmed tournament receive notification that they must choose to "Confirm" or "Cancel" their invitation slots, before the tournament may continue, they may choose to "Cancel" their player slot. In particular embodiments, if one or more players choose to "Cancel," their invitation slot, then the tournament may be able to run with the remaining set of accepted players. For the one or more players that have chosen to cancel their player slot, a withdraw command may be sent, and for them, the tournament may enter withdrawn stage 514. In particular embodiments, withdrawn stage 514 may allow the withdrawn player to leave the tournament and recover the player consideration that they paid without affecting the rest of the players in the tournament. In particular embodiments, for the remaining confirmed players, the tournament may proceed as described above.

In particular embodiments, distinctions may occur between scored stage 520, and winner stage 522 and loser stage 524 because of the nature of these games is the two groups comprising one or more individual players, directly competing against each other. The game provider usually handles the arena competition on dedicated servers. However, particular embodiments provide specific API integration points for those servers that allow particular embodiments to receive player characteristics, the win condition, and any other information so that the winning group may be determined in a secure and verifiable manner. Once the winning group is known, particular embodiments may equally divide the awarded prize by the number of participating players, and award each participating player their portion of the prize. In particular embodiments, all player-related action that the group must take during the stages leading up to running stage 408 of their tournament will be taken by a controlling or proxy player.

FIGS. 6-10 illustrate example graphical user interfaces (GUIs) or user experience (UX) for particular embodiments of game or tournament offerings and the features therein. Although particular examples of GUIs and UX are illustrated herein, a player need not interact with these particular GUIs or UX, and may have no knowledge of particular embodiments, in order to participate in games or tournaments that utilize one or more of the particular embodiments described herein.

Figure 6A:
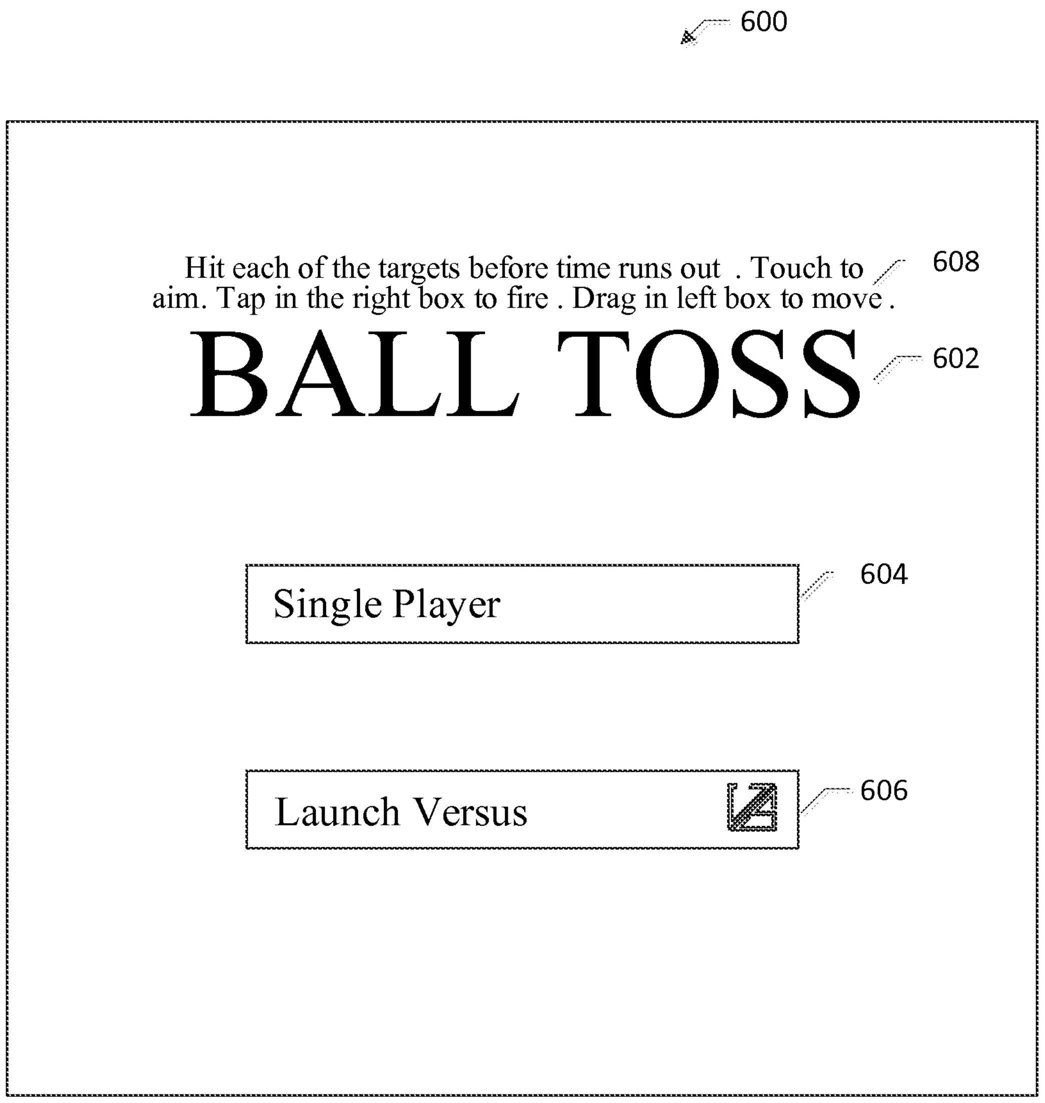
FIG. 6A illustrates a first example web portal embodiment.
Figure 6B:
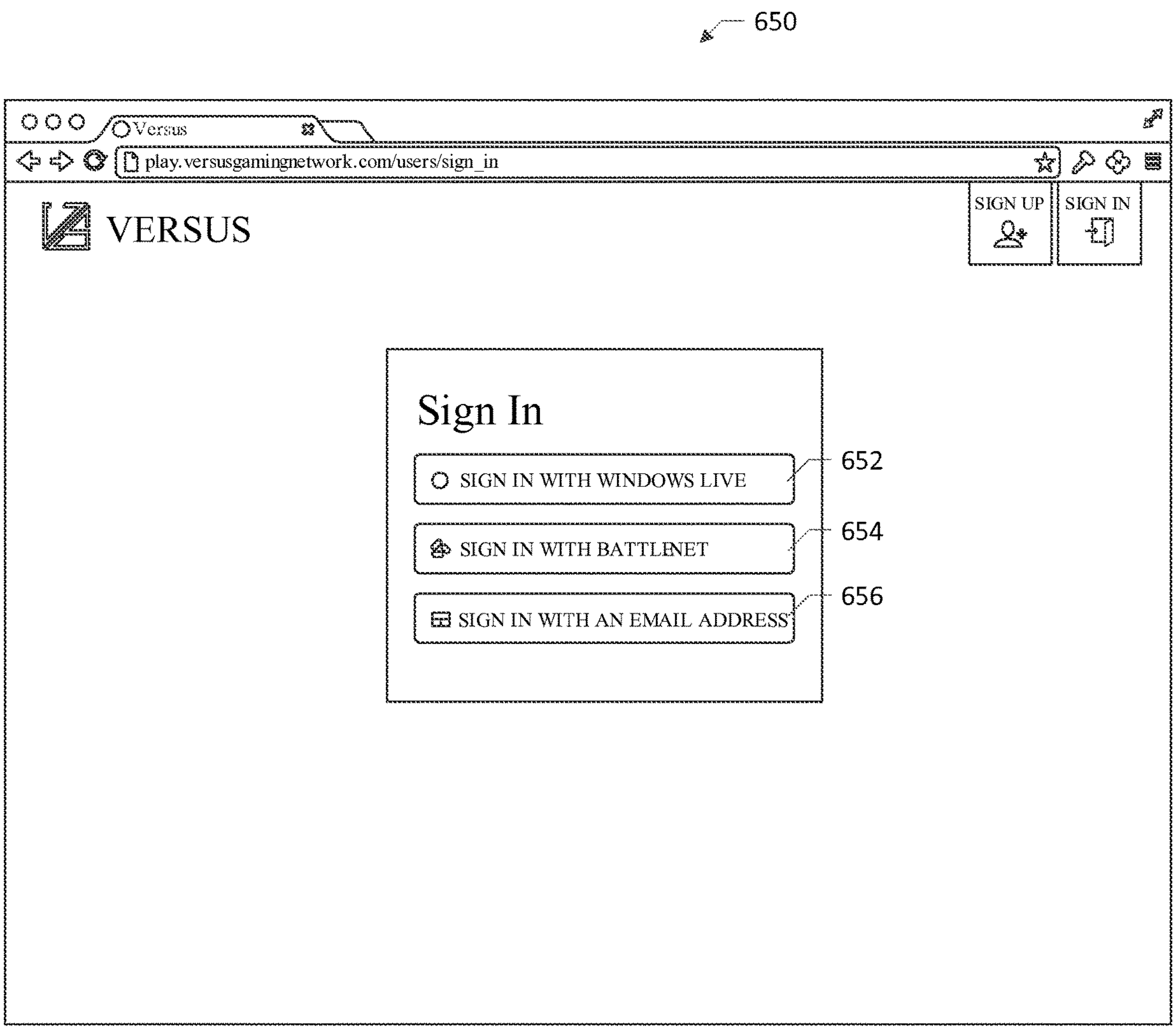
FIG. 6B illustrates a second example web portal embodiment.

In particular embodiments, a player may enter a game or tournament in one or more ways, including engaging a web portal, a game portal, or through a gaming network, such as a social gaming network like the Battle.net network created by Blizzard games, which comprises its own gaming network portal. FIGS. 6A-6B illustrate example UX with which a user may interact to enter a game or tournament.

FIG. 6A illustrates an example web portal embodiment of a game offering. In game portal page 600, an operator is offering a variety of tournaments for their game "Ball Toss," shown at 602. In this embodiment, particular embodiments comprise real-money tournaments of an asynchronous casual game. Description 608 describes particular features, including a win condition, for the "Ball Toss" game. Buttons 604 and 606 allow a player to choose how to enter a particular game. A player may select button 604 for "single player" or button 606 to "launch versus." In particular example embodiments, a game client provides a user the opportunity to play in "versus mode." When a player selects button 606 and launches versus, the game client on client 1130 of FIG. 11 communicates with the versus game integration API 1122, which causes the server 1120 to display particular web views on client 1130. Particular embodiments of the web views appear to sit on top of the game client itself. In particular embodiments, selecting button 604 or button 606 will launch versus, which will then lead the player to a series of GUIs or UX, such as in FIGS. 7-10, that allow them to access tournaments, credit-exchange and payment-processing systems, and certain information that is stored securely in their individual profiles, which will be described below.

FIG. 6B illustrates an example web portal page 650 where a player may access a game or tournament using any one of buttons 652, 654, 656. Button 652 illustrates an example embodiment where a player may access a game or tournament using "windows live." Button 654 illustrates an example embodiment where a player may access a game or tournament using "battle.net." Button 656 illustrates an example embodiment where a player may access a game or tournament using an email address.

Figure 7:
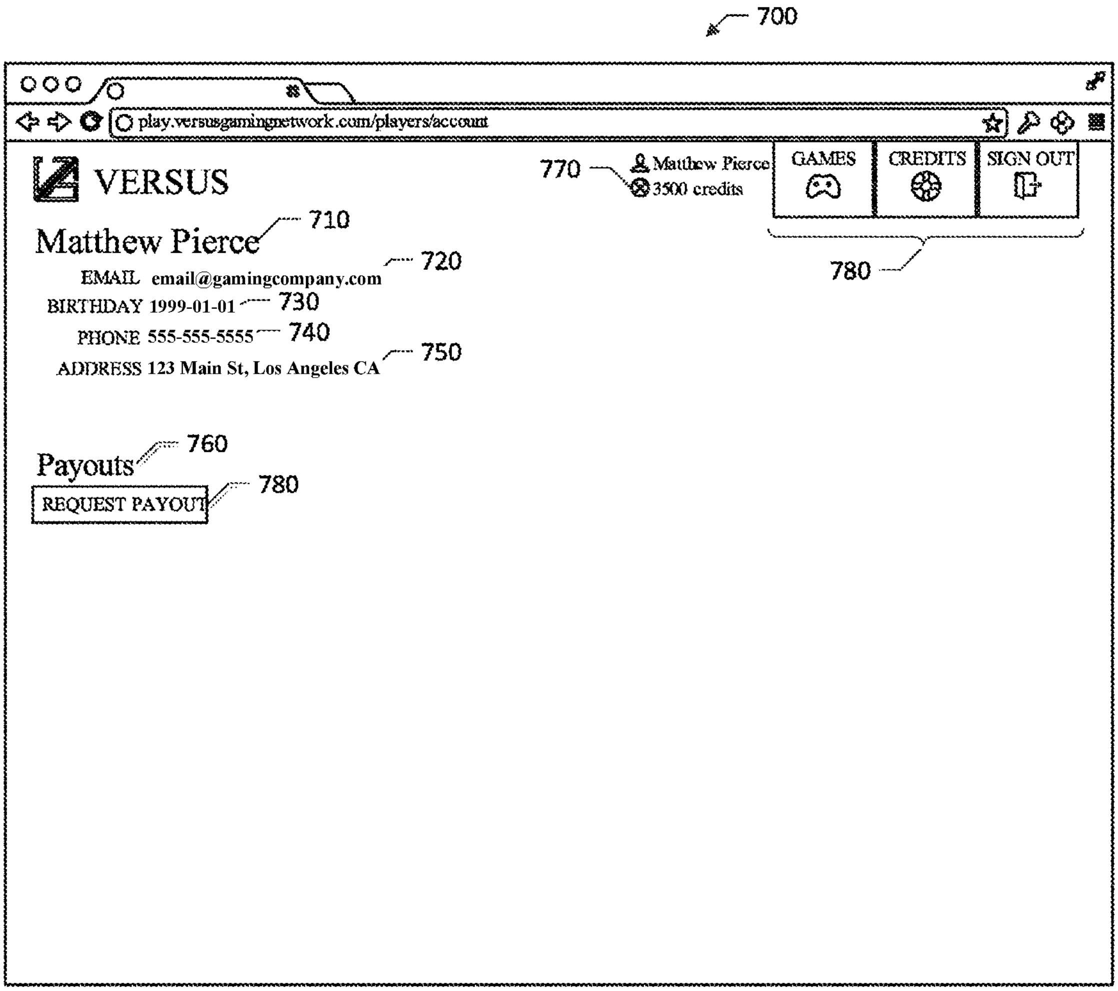
FIG. 7 illustrates an example player profile UX.

FIG. 7 illustrates an example player profile UX. In particular embodiments, a player profile UX 700 will have a unique ID that may include any one or more of the following: name 710, email address 720, birthday 730 from which a player's age may be calculated, phone number 740, and address 750. In particular embodiments, and as described above, a player's age, address, and phone number may be critical location-verification components necessary to receive real money payouts for particular games our tournaments. In particular embodiments, player profile UX 700 may also comprise elements to allow players to see their gaming history, including stats from each of their past games, such as wins, time, score, opponent, and the like, not shown, payouts 760, request payouts using button 780, and account balance 770. Player profile UX also comprises navigation bar 780 that allows players to move to one or more game or tournament UX through button 782, see credits using button 784, or to leave using signout button 786. Navigation bar 780, allows a player to move to any UX may be persistent throughout FIGS. 7-10. In particular embodiments, following the completion of a game or tournament, results of the game or tournament may be displayed in player profile UX 700. In particular embodiments, the game or tournament results may be match-making at a later date to ensure people of similar levels play one another.

Figure 8:
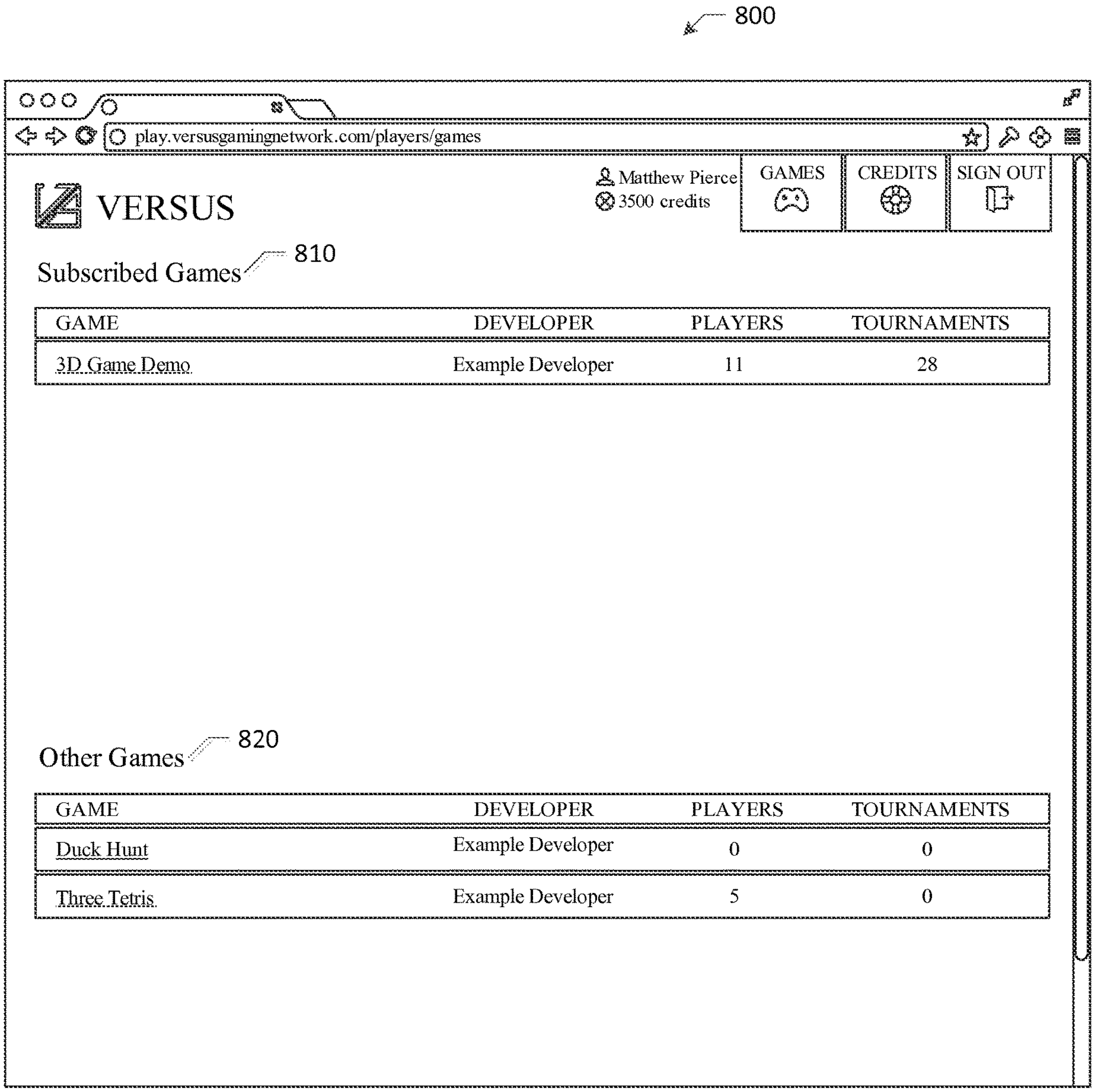
FIG. 8 illustrates an example game UX.

FIG. 8 illustrates an example game UX. In particular embodiments, games UX 800 includes a list of all the games that are currently offering tournaments that the player may access. In particular embodiments, a list of offered games may comprise subscribed games 810 and other games 820. In particular embodiments, when a player enters through a portal where the developer, publisher, or partner wants to cross-promote games, games UX 800 is where the players would find tournaments in each of those games. For example, if Blizzard wanted to offer players the opportunity to play StarCraft or HearthStone, games UX 800 would be where players have an opportunity to choose the game they want to play.

Figure 9:
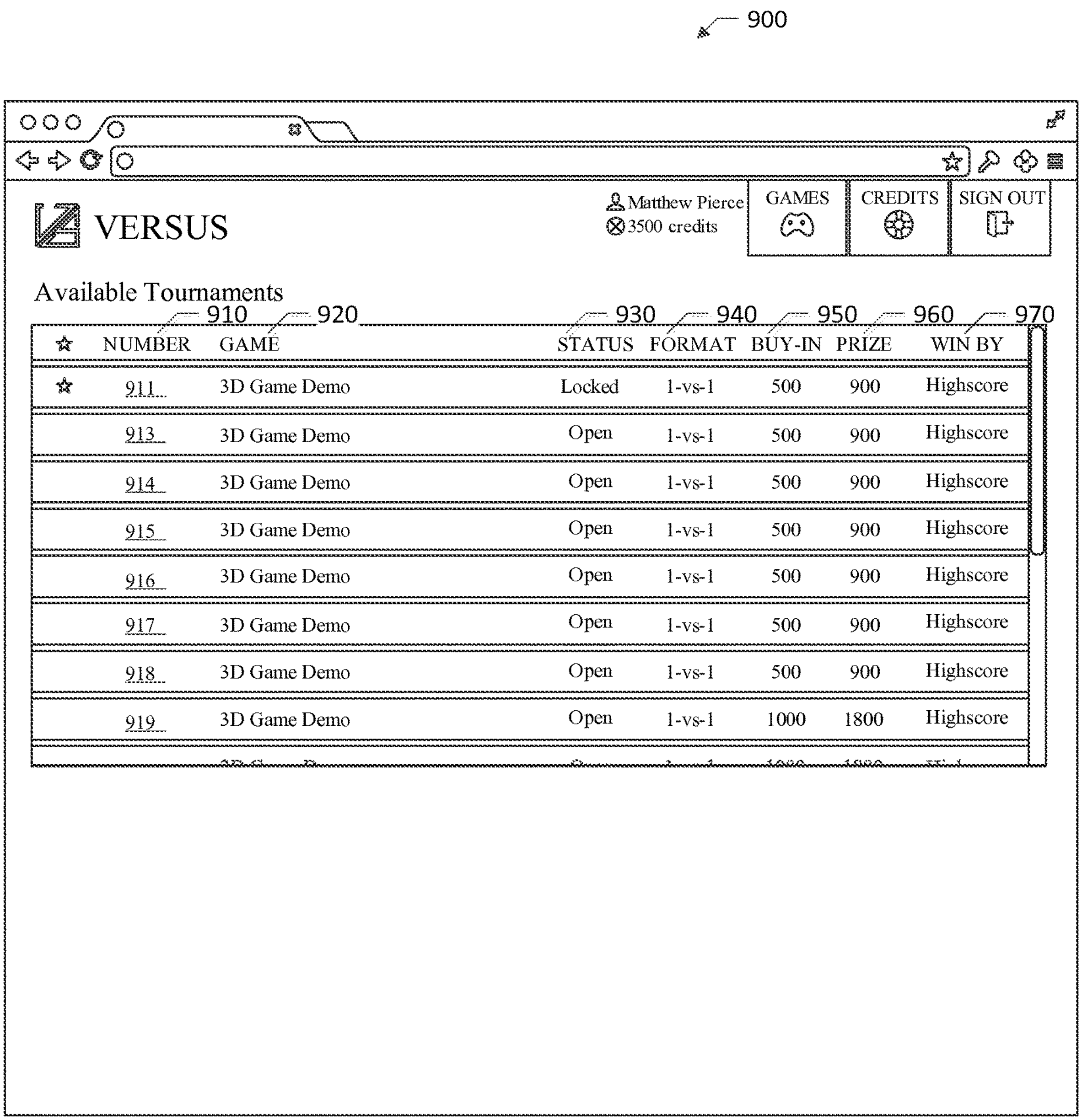
FIG. 9 illustrates an example tournament UX.

FIG. 9 illustrates an example tournament UX. In particular embodiments, once a player chooses a particular game, they enter a tournaments page 900 where they may choose and join a tournament. In particular embodiments, tournaments may be configured so that any developer, publisher, or partner may adjust the number of players or teams, the buy in, the prize amount, or the win condition, and those configurations will be illustrated on a tournaments page 900. In particular embodiments, there may always be multiple tournaments that are open and available. For example, below number 910 is a list of tournaments 911-919. Tournament number 911 is "locked", as illustrated in the status 930 column. Tournament numbers 913-919 are "open", as illustrated in the status 930 column. Game 920 column illustrates the type of tournament that is available. For example, Tournament numbers 911-919 are all "3D Game Demo" games. Players will be able to sort potential tournaments on any one of a number of criteria: number of players, such as format 940, buy-in amount 950, prize amount 960, win condition 970, and status 930, which may range from totally open, to just finding an open seat at a tournament that already has some players committed.

Figure 10A:
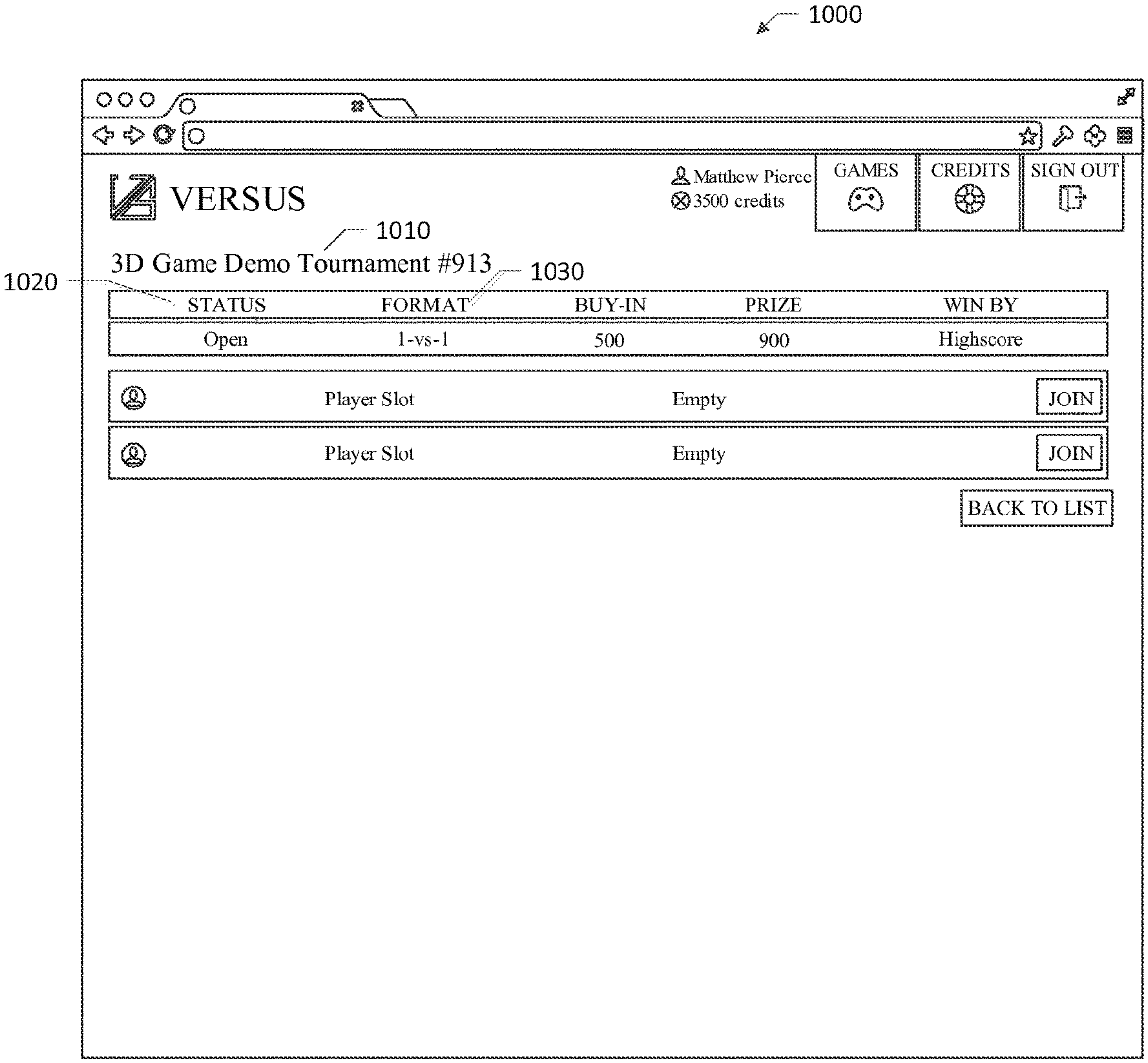
FIG. 10A illustrates a first state of a particular tournament UX.
Figure 10B:
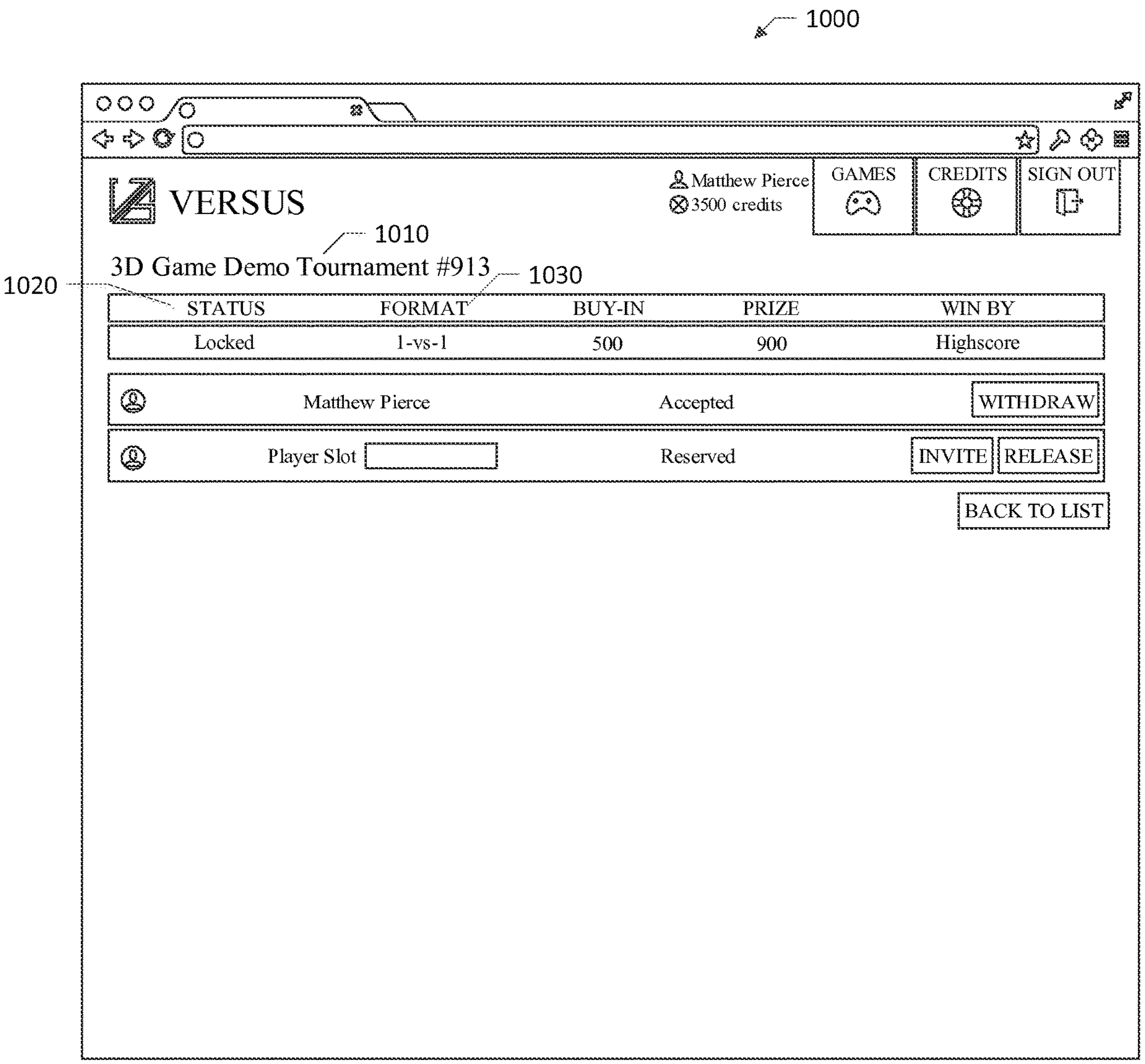
FIG. 10B illustrates a second state of a particular tournament UX.

FIGS. 10A-B illustrate a different states of a particular tournament UX. Once a player chooses a tournament, they enter the tournament page 1000 for that individual tournament. This page allows players to join a specific tournament, such as "3D Game Demo Tournament #913" illustrated in title bar 1010, at which point they may invite others, or open the slot so that it will accept a random player. In FIG. 10A, status 1020 indicates that 3D Game Demo Tournament #913 is currently open. Format 1030 illustrates an example format for 3D Game Demo Tournament #913 as a "1-vs-1" tournament and illustrates two available player slots. In FIG. 10B, status 1020 indicates that 3D Game Demo Tournament #913 is locked because Matthew Pierce has accepted one of the two available player slots in the tournament and the second player slot is reserved. Accepting a place in the tournament may trigger location-verification on IP and cellphone networks. In particular embodiments, free tournaments do not trigger location verification or payment processing of any kind. Accepting a place in the tournament may trigger the player consideration or buy-in amount to be paid. Once all the player slots are filled, and all players are verified to be in legal locations, all players are notified that the tournament is ready and they are given a "play now" option, not shown. Once a player clicks "play now" they are returned to the game and their data for that individual game performance is recorded. When the player's game ends, they are notified of their finishing position in the tournament based on a particular win condition.

Figure 11:
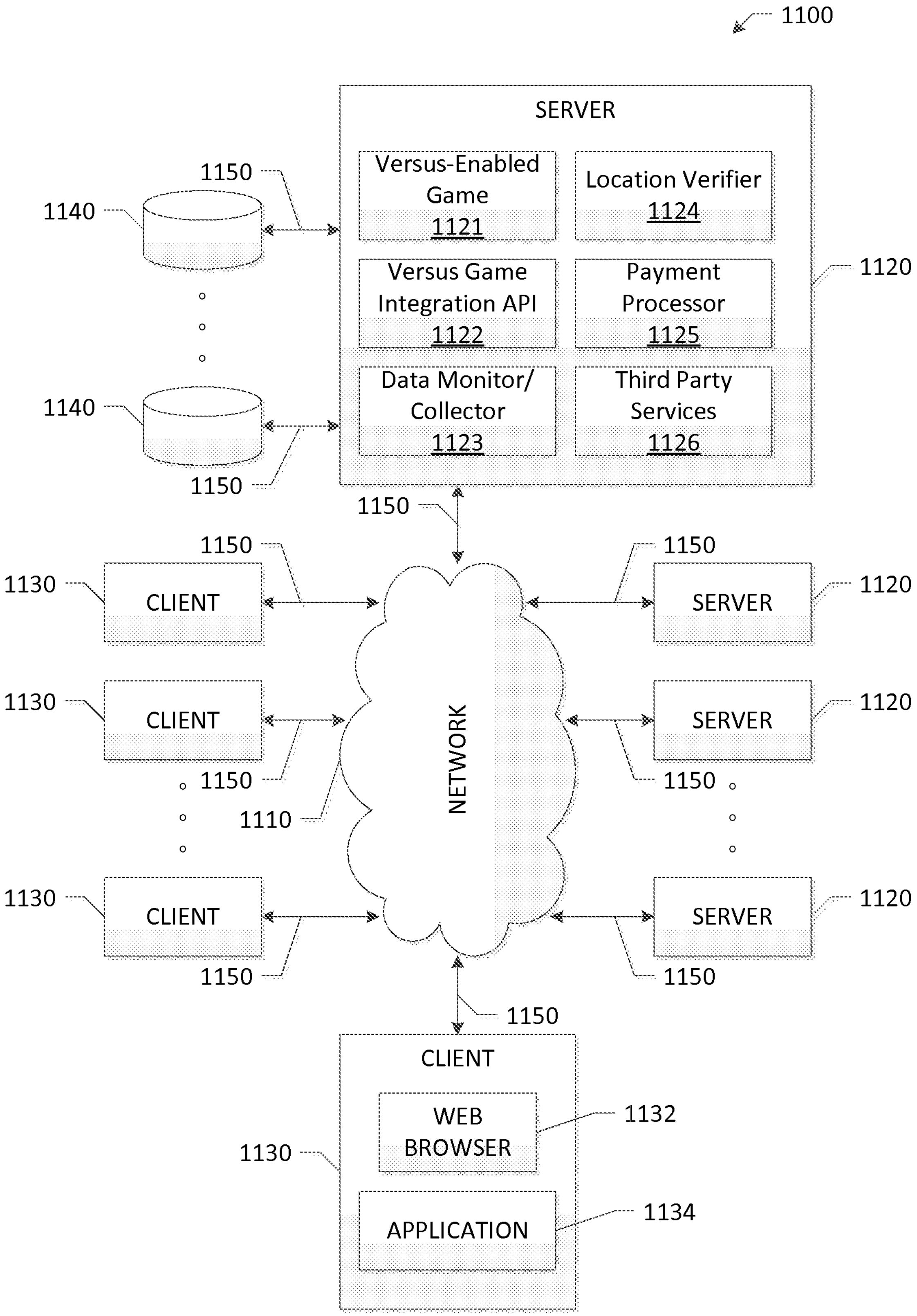
FIG. 11 illustrates an example network environment.

Particular embodiments may be implemented in an in-person environment, for example in an arcade implementation where players play a tournament from the same machine. Particular embodiments may be implemented in a network environment. FIG. 11 illustrates an example network environment 1100 suitable for providing software game and tournament operation including decreasing the role of chance in a particular tournament, conditional prize distribution, and other third party validation functionalities. Network environment 1100 includes a network 1110 coupling one or more servers 1120 and one or more clients 1130 to each other. In particular embodiments, network 1110 is an intranet, an extranet, a virtual private network (VPN), a local area network (LAN), a wireless LAN (WLAN), a wide area network (WAN), a metropolitan area network (MAN), a portion of the Internet, or another network 1110 or a combination of two or more such networks 1110. The present disclosure contemplates any suitable network 1110.

One or more links 1150 couple a server 1120 or a client 1130 to network 1110. In particular embodiments, one or more links 1150 each includes one or more wireline, wireless, or optical links 1150. In particular embodiments, one or more links 1150 each includes an intranet, an extranet, a VPN, a LAN, a WLAN, a WAN, a MAN, a portion of the Internet, or another link 1150 or a combination of two or more such links 1150. The present disclosure contemplates any suitable links 1150 coupling servers 1120 and clients 1130 to network 1110.

In particular embodiments, each server 1120 may be a unitary server or may be a distributed server spanning multiple computers or multiple datacenters. Servers 1120 may be of various types, such as, for example and without limitation, web server, news server, mail server, message server, advertising server, file server, application server, exchange server, database server, or proxy server. In particular embodiments, each server 1120 may include hardware, software, or embedded logic components or a combination of two or more such components for carrying out the appropriate functionalities implemented or supported by server 1120. For example, a web server is generally capable of hosting websites containing web pages or particular elements of web pages. More specifically, a web server may host HTML files or other file types, or may dynamically create or constitute files upon a request, and communicate them to clients 1130 in response to HTTP or other requests from clients 1130. A database server is generally capable of providing an interface for managing data stored in one or more data stores.

In particular embodiments, third party service 1126 may be used for tournament-matching or matchmaking, identity or age verification, for tax documentation, for any big-data reporting, for recording or reporting a player's earnings or losses, or for analytics based on player behavior. In particular embodiments, a phone number is used as a secondary form of location verification through a third-party service called Loc-Aid™ or LocationSmart® that verifies cell phone location in addition to IP address verification.

In particular embodiments, one or more data storages 1140 may be communicatively linked to one or more severs 1120 via one or more links 1150. In particular embodiments, data storages 1140 may be used to store various types of information. In particular embodiments, the information stored in data storages 1140 may be organized according to specific data structures. In particular embodiment, each data storage 1140 may be a relational database. Particular embodiments may provide interfaces that enable servers 1120 or clients 1130 to manage, e.g., retrieve, modify, add, or delete, the information stored in data storage 1140.

In particular embodiments, each client 1130 may be an electronic device including hardware, software, or embedded logic components or a combination of two or more such components and capable of carrying out the appropriate functionalities implemented or supported by client 1130. For example and without limitation, a client 1130 may be a desktop computer system, a notebook computer system, a netbook computer system, a handheld electronic device, a tablet computer, a mobile telephone, a slot machine, an internet-connected console, such as Xbox, Sony Playstation®, Nintendo®, Ouya, SteamBox, or other, any devices running iOS, Mac OS, Windows, Android, a wearable computer, such as Google Glass or similar device, or a virtual reality or augmented reality device, such as Oculus. The present disclosure contemplates any suitable clients 1130. A client 1130 may enable a network user at client 1130 to access network 1130. A client 1130 may enable its user to communicate with other users at other clients 1130.

A client 1130 may have a web browser 1132, such as MICROSOFT INTERNET EXPLORER, GOOGLE CHROME, MOZILLA FIREFOX, SAFARI, or OPERA and may have one or more add-ons, plug-ins, or other extensions, such as TOOLBAR. A user at client 1130 may enter a Uniform Resource Locator (URL) or other address directing the web browser 1132 to a server 1120, and the web browser 1132 may generate a Hyper Text Transfer Protocol (HTTP) request and communicate the HTTP request to server 1120. Server 1120 may accept the HTTP request and communicate to client 1130 one or more Hyper Text Markup Language (HTML) files responsive to the HTTP request. Client 1130 may render a web page based on the HTML files from server 1120 for presentation to the user. The present disclosure contemplates any suitable web page files. As an example and not by way of limitation, web pages may render from HTML files, Extensible Hyper Text Markup Language (XHTML) files, or Extensible Markup Language (XML) files, Ruby-on-Rails, NodeJS, Scala, PHP, python, or java, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

A client 1130 may have an application 1134 that runs a game, such as a versus-enabled game. Application 1134 may be written in native iOS, Android, Windows, HTML5, Apple OS, C, C++, Flash, Java, Python, Rails, Scala, Unity, Windows OS or any other language specific to a particular client 1130. Application 1134 may be locally stored, cloud-based, streamed, downloaded, physical, or any combination thereof. Running application 1134 may run the game locally or cause client 1130 to communicate with versus game integration API 1122 that allows client 1130 to communicate with versus-enabled game 1121 on server 1120. Any action by a user to add or withdraw credits, join tournaments, invite other players, and participate in tournaments may prompt server 1120 to interact with third party services 1126. Third party services 1126 may communicate with third parties for purposes of verifying a user's identity, location, and age. In particular embodiments, when a player chooses to participate in a tournament, server 1120 may communicate with client 1130 to launch the game on client 1130. Following completion of a game or tournament, client 1130 may communicate the player's score and gameplay history to data monitor/collector 1123 on server 1120. Player data may be stored in data storages 1140. The data is stored so that players, developers, third party affiliates, and versus will have access to that player's game history for analytics purposes, data mining, and fraud-prevention services.

A client 1130 may have a web browser 1132, as described above, that renders a web page based on the files from server 1120 for presentation to the user. A player or user may enter a game platform via a web portal presented to the user on client 1130. In particular embodiments, particular games require particular compatibility with client 1130. A player or user may enter a game platform through a UX, such as web portal 600 and 650 illustrated above in FIGS. 6A-B. Client 1130 may communicate directly with versus-enabled game 1121 on server 1120. Server 1120 may render one or more web pages based on the files from server 1120 for presentation to the user. Server 1120 may allow user to access one or more versus-enabled games 1121 on server 1120.

Figure 12:
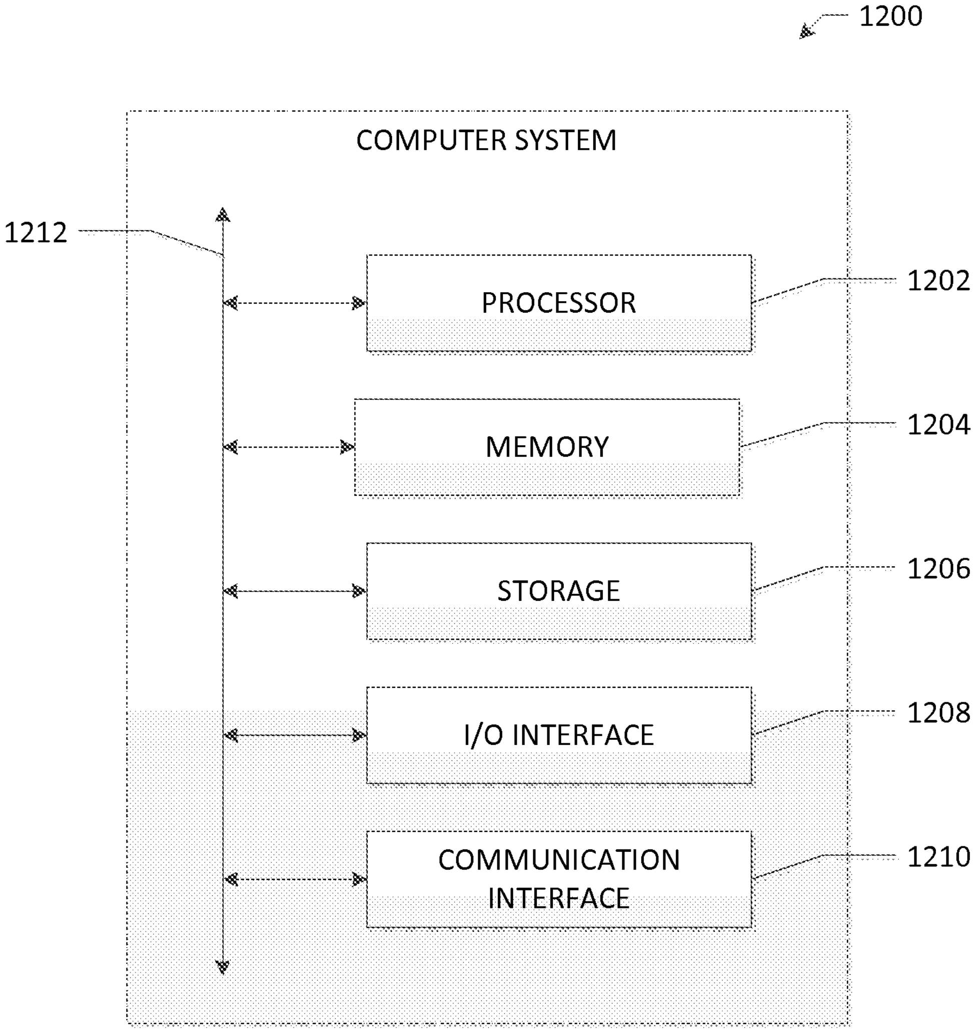
FIG. 12 illustrates an example computer system.

FIG. 12 illustrates an example computer system. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200.

The invention contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, an arcade console, a mainframe, a mesh of computer systems, a mobile telephone, a personal digital assistant (PDA), a server, or a combination of two or more of these. Where appropriate, computer system 1200 may include one or more computer systems 1200; be unitary or distributed; span multiple locations; span multiple machines; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. The present invention contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. Processor 1202 may include one or more arithmetic logic units (ALUs); be a multi-core processor; or include one or more processors 1202.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 1204 may include one or more memories 1204, where appropriate.

In particular embodiments, storage 1206 includes mass storage for data or instructions. As an example and not by way of limitation, storage 1206 may include an HDD, a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206.

In particular embodiments, I/O interface 1208 includes hardware, software, or both providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, game controller, microphone, monitor, mouse, printer, scanner, speaker, still camera, stylus, tablet, touch screen, trackball, video camera, another suitable I/O device or a combination of two or more of these. An I/O device may include one or more sensors. Where appropriate, I/O interface 1208 may include one or more device or software drivers enabling processor 1202 to drive one or more of these I/O devices. I/O interface 1208 may include one or more I/O interfaces 1208, where appropriate.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1212 may include one or more buses 1212, where appropriate.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This invention contemplates one or more computer-readable storage media implementing any suitable storage. In particular embodiments, a computer-readable storage medium implements one or more portions of processor 1202 (such as, for example, one or more internal registers or caches), one or more portions of memory 1204, one or more portions of storage 1206, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language. In particular embodiments, software is expressed in ruby-on-rails, Node.js, Python, Scala, or Unity.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising:

receiving, from a sponsor, a qualifying condition for selecting one or more eligible players qualified to participate in a video game competition based on one or more player characteristics associated with each player in a pool of potential players;

receiving, from said sponsor, a payout election associated with a payout to be distributed to said pool of potential players;

receiving, from said sponsor, a win condition for determining a situation if said one or more eligible players are able to receive said payout;

identifying said one or more eligible players with player characteristics matching said qualifying condition from said pool of potential players;

displaying said payout election and win condition to said one or more eligible players;

receiving an election to enter said video game competition from a participating player, said participating player being one of said one or more eligible players;

for each eligible player, determining speed of execution of a video game for the eligible player based on one or more of hardware, software, or peripherals used by the eligible player;

determining that the speed of execution of a particular eligible player is higher than another eligible player;

responsive to determining that the speed of execution of the particular eligible player is higher than one or more other eligible players, equalizing the speed of execution of the one or more eligible players by adding a lag to an internet feed sent to the particular eligible player;

sending said participating player to an operator of said video game competition;

receiving competition results of said video game competition from said operator;

analyzing said competition results to identify one or more winning players from a pool of participating players who achieved said win condition; and distributing said payout to said one or more winning players.

2. The method of claim 1, wherein said qualifying condition comprises a player location.

3. The method of claim 1, further comprising displaying an option to enter said video game competition to said one or more eligible players.

4. The method of claim 1, wherein performing equalization comprises:

responsive to determining that the particular eligible player has a device with faster internet connection compared to one or more other eligible player, adding a lag to the internet feed sent to the device of the particular eligible player.

5. The method of claim 1, wherein determining speed of execution of a video game for the device of each eligible player comprises performing an internet speed test for the eligible player to determine a rate at which players will receive access to game information.

6. The method of claim 1, wherein determining speed of execution of a video game for the device of each eligible player comprises performing a processor speed test for the eligible player to determine a rate at which players will receive access to game information.

7. The method of claim 1, further comprising:

synchronizing generation of random numbers across the one or more eligible players, the synchronizing ensuring that each of the one or more eligible players uses the same set of pseudo-random events driving the video game of for the eligible player.

8. The method of claim 1, wherein each game is associated with a set of game conditions, the method further comprising:

for each eligible player, evaluating each game condition by performing a Monte Carlo simulation by replaying the commands of the eligible player by adjusting the game condition.

9. A non-transitory computer readable storage medium storing instructions that when executed by a computer processor cause the computer processor to perform steps comprising:

receiving, from a sponsor, a qualifying condition for selecting one or more eligible players qualified to participate in a video game competition based on one or more player characteristics associated with each player in a pool of potential players;

receiving, from said sponsor, a payout election associated with a payout to be distributed to said pool of potential players;

receiving, from said sponsor, a win condition for determining a situation if said one or more eligible players are able to receive said payout;

identifying said one or more eligible players with player characteristics matching said qualifying condition from said pool of potential players;

displaying said payout election and win condition to said one or more eligible players;

receiving an election to enter said video game competition from a participating player, said participating player being one of said one or more eligible players;

for each eligible player, determining speed of execution of a video game for the eligible player based on one or more of hardware, software, or peripherals used by the eligible player;

determining that the speed of execution of a particular eligible player is higher than another eligible player;

responsive to determining that the speed of execution of the particular eligible player is higher than one or more other eligible players, equalizing the speed of execution of the one or more eligible players by adding a lag to an internet feed sent to the particular eligible player;

sending said participating player to an operator of said video game competition;

receiving competition results of said video game competition from said operator;

analyzing said competition results to identify one or more winning players from a pool of participating players who achieved said win condition; and distributing said payout to said one or more winning players.

10. The non-transitory computer readable storage medium of claim 9, wherein performing equalization comprises:

responsive to determining that the particular eligible player has a device with faster internet connection compared to one or more other eligible player, adding a lag to the internet feed sent to the device of the particular eligible player.

11. The non-transitory computer readable storage medium of claim 9, wherein determining speed of execution of a video game for the device of each eligible player comprises performing an internet speed test for the eligible player to determine a rate at which players will receive access to game information.

12. The non-transitory computer readable storage medium of claim 9, wherein determining speed of execution of a video game for the device of each eligible player comprises performing a processor speed test for the eligible player to determine a rate at which players will receive access to game information.

13. The non-transitory computer readable storage medium of claim 9, the instructions further causing the computer processor to perform steps comprising:

synchronizing generation of random numbers across the one or more eligible players, the synchronizing ensuring that each of the one or more eligible players uses the same set of pseudo-random events driving the video game of for the eligible player.

14. The non-transitory computer readable storage medium of claim 9, wherein each game is associated with a set of game conditions, the instructions further causing the computer processor to perform steps comprising:

for each eligible player, evaluating each game condition by performing a Monte Carlo simulation by replaying the commands of the eligible player by adjusting the game condition.

15. A computer system comprising:

a computer processor; and a non-transitory computer readable storage medium storing instructions that when executed by the computer processor cause the computer processor to perform steps comprising:

receiving, from a sponsor, a qualifying condition for selecting one or more eligible players qualified to participate in a video game competition based on one or more player characteristics associated with each player in a pool of potential players;

receiving, from said sponsor, a payout election associated with a payout to be distributed to said pool of potential players;

receiving, from said sponsor, a win condition for determining a situation if said one or more eligible players are able to receive said payout;

identifying said one or more eligible players with player characteristics matching said qualifying condition from said pool of potential players;

displaying said payout election and win condition to said one or more eligible players;

receiving an election to enter said video game competition from a participating player, said participating player being one of said one or more eligible players;

for each eligible player, determining speed of execution of a video game for the eligible player based on one or more of hardware, software, or peripherals used by the eligible player;

determining that the speed of execution of a particular eligible player is higher than another eligible player;

responsive to determining that the speed of execution of the particular eligible player is higher than one or more other eligible players, equalizing the speed of execution of the one or more eligible players by adding a lag to an internet feed sent to the particular eligible player;

sending said participating player to an operator of said video game competition;

receiving competition results of said video game competition from said operator;

analyzing said competition results to identify one or more winning players from a pool of participating players who achieved said win condition; and distributing said payout to said one or more winning players.

16. The computer system of claim 15, wherein performing equalization comprises:

responsive to determining that the particular eligible player has a device with faster internet connection compared to one or more other eligible player, adding a lag to the internet feed sent to the device of the particular eligible player.

17. The computer system of claim 15, wherein determining speed of execution of a video game for the device of each eligible player comprises performing an internet speed test for the eligible player to determine a rate at which players will receive access to game information.

18. The computer system of claim 15, wherein determining speed of execution of a video game for the device of each eligible player comprises performing a processor speed test for the eligible player to determine a rate at which players will receive access to game information.

19. The computer system of claim 15, the instructions further causing the computer processor to perform steps comprising:

synchronizing generation of random numbers across the one or more eligible players, the synchronizing ensuring that each of the one or more eligible players uses the same set of pseudo-random events driving the video game of for the eligible player.

20. The computer system of claim 15, wherein each game is associated with a set of game conditions, the instructions further causing the computer processor to perform steps comprising:

for each eligible player, evaluating each game condition by performing a Monte Carlo simulation by replaying the commands of the eligible player by adjusting the game condition.

* * * * *